(12) United States Patent
Bando et al.

(10) Patent No.: US 8,983,709 B2
(45) Date of Patent: Mar. 17, 2015

(54) AUTONOMOUS TRAVEL SYSTEM

(75) Inventors: Mikio Bando, Tokyo (JP); Yukihiro Kawamata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/357,130

(22) PCT Filed: Nov. 9, 2011

(86) PCT No.: PCT/JP2011/006248
§ 371 (c)(1),
(2), (4) Date: May 8, 2014

(87) PCT Pub. No.: WO2013/069054
PCT Pub. Date: May 16, 2013

(65) Prior Publication Data
US 2014/0316635 A1  Oct. 23, 2014

(51) Int. Cl.
*G05D 1/02* (2006.01)
*G01C 21/34* (2006.01)
*B60W 30/14* (2006.01)
*G01C 21/28* (2006.01)
(Continued)

(52) U.S. Cl.
CPC .......... *G05D 1/0274* (2013.01); *G01C 21/3461* (2013.01); *B60W 30/14* (2013.01); *G01C 21/28* (2013.01); *G05D 2201/0213* (2013.01); *G08G 1/0962* (2013.01); *G08G 1/096716* (2013.01); *G08G 1/096758* (2013.01); *G08G 1/096783* (2013.01)
USPC .............................. 701/25; 700/302; 324/654

(58) Field of Classification Search
USPC .............................. 701/25; 700/302; 324/654
See application file for complete search history.

(56) References Cited

U.S. PATENT DOCUMENTS 4,628,454 A * 12/1986 Ito ..................................... 701/25
5,202,833 A * 4/1993 Fodale ........................... 701/68
(Continued)

FOREIGN PATENT DOCUMENTS

| JP | 6-83445 A | 3/1994 |
| JP | 9-508740 A | 9/1997 |

(Continued)

OTHER PUBLICATIONS

Ismail, Z.H., Dunnigan, M.W., "An adaptive region boundary-based control scheme for an autonomous underwater vehicle," Publication Year: 2010, pp. 324-329.*

(Continued)

Primary Examiner — Tuan C. To
(74) Attorney, Agent, or Firm — Crowell & Moring LLP

(57) ABSTRACT

Provided is an autonomous travel system having an operation management unit including a map database with a combination of topological region maps, on which the range of travel of a vehicle is expressed as points and lines, and metric region maps, on which the travel range is expressed on planar maps; a vehicle position management unit for managing the position of the vehicle; and a vehicle travel planning unit for planning vehicle travel, which, if the vehicle is present near the boundary of a map, blocks the map boundary so that other vehicles will not advance into another map. The operation management unit is provided with a blockage setting unit for dividing a boundary section of a map into a plurality of regions and releasing the blockage of the boundary of a divided region in which no vehicles are present in front of the vehicle in the direction of travel.

13 Claims, 17 Drawing Sheets

(51) Int. Cl.
*G08G 1/0962* (2006.01)
*G08G 1/0967* (2006.01)

(56) References Cited

U.S. PATENT DOCUMENTS

| | | | |
|---|---|---|---|
| 5,528,888 A * | 6/1996 | Miyamoto et al. | 56/10.2 F |
| 5,586,030 A | 12/1996 | Kemner et al. | |
| 5,659,596 A * | 8/1997 | Dunn | 455/456.1 |
| 6,708,112 B1 * | 3/2004 | Beesley et al. | 701/533 |
| 6,721,653 B2 * | 4/2004 | Watanabe et al. | 701/457 |
| 7,050,061 B1 * | 5/2006 | Baldwin | 345/552 |
| 7,873,448 B2 * | 1/2011 | Takeda et al. | 701/26 |
| 2003/0023356 A1 * | 1/2003 | Keable | 701/23 |
| 2004/0133341 A1 * | 7/2004 | Spriggs | 701/200 |
| 2005/0046373 A1 * | 3/2005 | Aldred | 318/580 |
| 2005/0075785 A1 * | 4/2005 | Gray et al. | 701/202 |
| 2006/0238340 A1 * | 10/2006 | Harvey | 340/550 |
| 2009/0037041 A1 * | 2/2009 | Senneff et al. | 701/23 |
| 2009/0240430 A1 * | 9/2009 | Sachs et al. | 701/207 |
| 2010/0076640 A1 | 3/2010 | Maekawa et al. | |
| 2011/0153541 A1 * | 6/2011 | Koch et al. | 706/52 |
| 2011/0166737 A1 * | 7/2011 | Tanaka et al. | 701/25 |
| 2011/0167574 A1 * | 7/2011 | Stout et al. | 15/3 |
| 2011/0202175 A1 * | 8/2011 | Romanov et al. | 700/250 |
| 2011/0295423 A1 * | 12/2011 | Anderson | 700/248 |
| 2012/0078417 A1 * | 3/2012 | Connell et al. | 700/248 |
| 2012/0123677 A1 * | 5/2012 | Shimotani et al. | 701/454 |

FOREIGN PATENT DOCUMENTS

| | | |
|---|---|---|
| JP | 2000-285373 A | 10/2000 |
| JP | 2008-9638 A | 1/2008 |
| JP | 2010-73080 A | 4/2010 |

OTHER PUBLICATIONS

Weina Lu, Haifang Wang, Qingzhu Wang, "A Synchronous Detection of the Road Boundary and Lane Marking for Intelligent Vehicles," vol. 1, Publication Year: 2007, pp. 741-745.*
International Search Report dated Feb. 7, 2012 with English translation (5 pages).

* cited by examiner

FIG. 2

TOPOLOGICAL REGION

| | | |
|---|---|---|
| 201 | LINK ID | ID UNIQUELY DETERMINING LINK |
| 202 | LINK START POINT | START COORDINATES OF LINK |
| 203 | LINK END POINT | END COORDINATES OF LINK |
| 204 | NUMBER OF LINK DIVISIONS | NUMBER OF SUB-LINKS INCLUDED IN LINK |
| 205 | SUB-LINK ID | ID UNIQUELY DETERMINING SUB-LINK GENERATED BY DIVIDING LINK INTO MULTIPLE PIECES |
| 206 | SUB-LINK START POINT | START COORDINATES OF SUB-LINK |
| 207 | SUB-LINK END POINT | END COORDINATES OF SUB-LINK |
| | SUB-LINK ID | ... |
| | ⋮ | |
| | ⋮ | |
| | LINK ID | ... |
| | LINK START POINT | ... |
| | ⋮ | |
| | ⋮ | |

FIG. 3

METRIC REGION

| | | |
|---|---|---|
| 301 | METRIC ID | ID UNIQUELY DETERMINING METRIC REGION |
| 302 | METRIC SHAPE | INFORMATION REPRESENTING METRIC SHAPE |
| 303 | NUMBER OF CONNECTION LINKS | TOTAL NUMBER OF LINKS CONNECTED TO METRIC REGION |
| 304 | CONNECTION LINK | ID OF LINK CONNECTED TO METRIC REGION |
| 305 | CONNECTION NODE | COORDINATES OF NODE AT WHICH CONNECTION LINK IS CONNECTED TO METRIC REGION |
| 306 | CONNECTION POINT | COORDINATES OF METRIC REGION AT WHICH CONNECTION LINK IS CONNECTED |
| | CONNECTION LINK | ... |
| | CONNECTION NODE | ... |
| | CONNECTION POINT | ... |
| | CONNECTION LINK | ... |
| | ⋮ | |
| 307 | NUMBER OF AREAS | NUMBER OF DIVISIONS OF METRIC REGION |
| 308 | AREA ID | ID INDICATING AREA GENERATED BY DIVIDING METRIC REGION INTO MULTIPLE REGIONS |
| 309 | AREA SHAPE | INFORMATION REPRESENTING SHAPE OF AREA |
| | AREA ID | ... |
| | ⋮ | |
| | ⋮ | |
| | METRIC ID | ... |
| | METRIC SHAPE | ... |
| | ⋮ | |

FIG. 5

TOPOLOGICAL REGION

| 501 — LINK ID | ID INDICATING LINK IN MAP DB |
|---|---|
| 502 — SUB-LINK ID | ID INDICATING SUB-LINK GENERATED BY DIVIDING LINK INTO MULTIPLE REGIONS |
| 503 — BLOCKING VEHICLE NUMBER | NUMBER OF VEHICLE THAT BLOCKS SUB-LINK (MAXIMUM IS TOTAL NUMBER OF MANAGED VEHICLES) (IN ORDER OF PRIORITY) |
| SUB-LINK ID | ... |
| BLOCKING VEHICLE NUMBER | ... |
| ⋮ | ⋮ |
| LINK ID | ... |
| SUB-LINK ID | ... |
| ⋮ | ⋮ |

FIG. 6

METRIC REGION

| 601 — METRIC ID | ID INDICATING METRIC REGION IN MAP DB |
|---|---|
| 602 — AREA ID | ID INDICATING AREA GENERATED BY DIVIDING METRIC REGION INTO MULTIPLE REGIONS |
| 603 — BLOCKING VEHICLE NUMBER | NUMBER OF VEHICLE THAT BLOCKS AREA (MAXIMUM IS TOTAL NUMBER OF MANAGED VEHICLES) (IN ORDER OF PRIORITY) |
| AREA ID | ... |
| BLOCKING VEHICLE NUMBER | ... |
| ⋮ | ⋮ |
| METRIC ID | ... |
| AREA ID | ... |
| ⋮ | ⋮ |

FIG. 7

| | | |
|---|---|---|
| 701 | TOTAL NUMBER OF MANAGED VEHICLES | M |
| | ⋮ | |
| 702 | MANAGED VEHICLE NUMBER | N |
| 703 | PRIORITY | (INTEGER FROM 1 TO M) |
| 704 | DESTINATION (POSITION ON MAP) | (LINK NUMBER OR PLANE NUMBER), (DISTANCE FROM LINK START POINT OR POSITION ON PLANE) |
| 705 | VEHICLE POSITION (POSITION ON MAP) | (LINK NUMBER OR PLANE NUMBER), (DISTANCE FROM LINK START POINT OR POSITION ON PLANE) |
| 706 | ABSOLUTE POSITION (POSITION ON EARTH) | LATITUDE, LONGITUDE, ALTITUDE |
| 707 | BOUNDARY PASSAGE INFORMATION | (PASSED) OR (NOT PASSED) |
| 708 | PREVIOUS VEHICLE POSITION (POSITION ON MAP) | (LINK NUMBER OR PLANE NUMBER), (DISTANCE FROM LINK START POINT OR POSITION ON PLANE) |
| 709 | TRAVEL PATH | (PASSAGE NODE POSITION, SEQUENCE OF PASSAGE POINTS) |
| | MANAGED VEHICLE NUMBER | N+1 |
| | ⋮ | |

FIG. 8

| SMALL REGION NUMBER (801) | START POINT (802) | END POINT (803) | BLOCKED STATE (804) |
|---|---|---|---|
| 1 | (X1, Y1) | (X2, Y2) | UNBLOCKED |
| 2 | (X2, Y2) | (X3, Y3) | BLOCKED |
| 3 | (X3, Y3) | (X4, Y4) | UNBLOCKED |
| ... | | | ... |

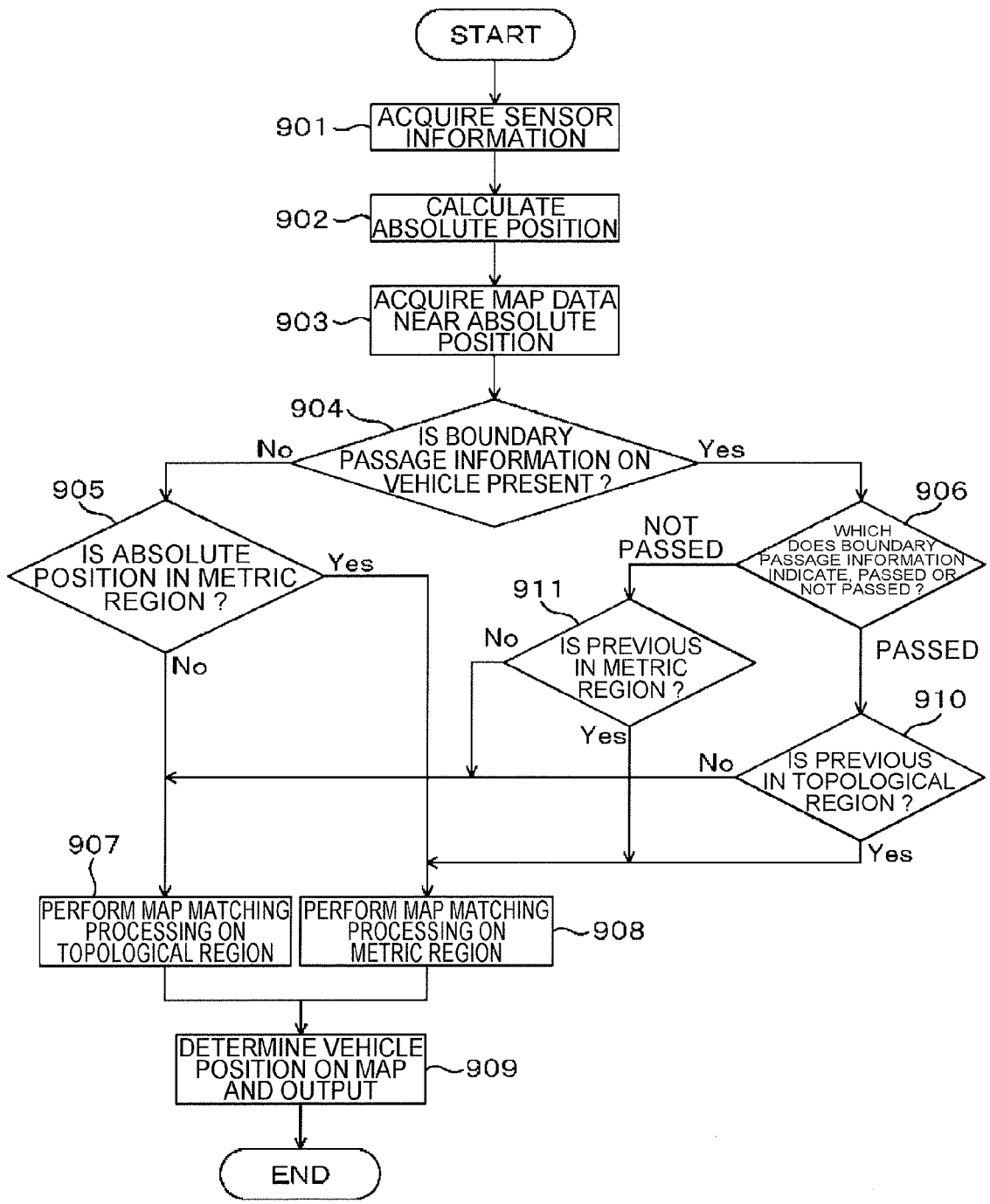

AUTONOMOUS TRAVEL SYSTEM

TECHNICAL FIELD

The present invention relates to a system in which moving objects, such as an automobile and a train, travel autonomously.

BACKGROUND ART

In a conventional autonomous travel system, each vehicle determines a region to which the vehicle can move and travels while setting an obstacle-free path. In addition, according to the invention described in JP-A-2008-9638, the system sets points, each of which is the endpoint of an impassable region, using a topological map in which road connections are represented by points and lines and allows a vehicle to travel on a travel path on the topological map that circumvents those points, thus enabling an efficient and safe autonomous travel.

According to the invention described in JP-A-2010-73080, the method recognizes a travelable space, sets a travel path in that space, and allows a vehicle to move according to that travel path, thus implementing a free and efficient behavior in the space. Those conventional technologies implement autonomous traveling using a single piece of map data. By combining these conventional technologies, even if a region (topological region) that uses a topological map representing road connections by points and lines and a region (metric region) that uses a metric map representing travelable spaces are mixed, block control only within a topological region and block control only within a metric region can be performed.

CITATION LIST

Patent Literature

Patent Literature 1: JP-A-2008-9638
Patent Literature 2: JP-A-2010-73080

SUMMARY OF INVENTION

Technical Problem

However, the conventional technologies do not consider a blocking method for the boundary between a topological region and a metric region. The boundary between a topological region and a metric region exists in a form in which a boundary point in the topological map is connected to a boundary side of the metric map. The simplest blocking method is that, if a vehicle is present near the boundary between a topological region and a metric region, the boundary point in the topological map and the boundary side in the metric map, connected to that boundary point, are simply blocked to prevent any vehicle from passing through the boundary for ensuring safe operations. However, this method may decrease the operation efficiency depending upon the position of a vehicle that is present near a boundary. For example, a vehicle that can normally enter the boundary is stopped or a bypass instruction is issued to a vehicle that normally need not bypass the boundary.

Solution to Problem

The problem that the operation efficiency is decreased as described above is a problem with block control on the boundary between a topological region and a metric region. This problem can be solved, not by blocking all corresponding boundary points and boundary sides, but by dividing the boundary side into a plurality of regions and releasing the blocked state of a region in which there is no vehicle.

Advantageous Effects of Invention

In an autonomous travel system that has multiple types of map, the operation of a moving object can be performed safely and efficiently by setting blocked regions in detail on a boundary where the map representation method changes from topological to metric or vice versa.

BRIEF DESCRIPTION OF DRAWINGS

FIG. 2 is a diagram showing the data structure of a topological region in a map database.
FIG. 3 is a diagram showing the data structure of a metric region in a map database.
FIG. 5 is a diagram showing the data structure of a topological region in a blocked region database.
FIG. 6 is a diagram showing the data structure of a metric region in the blocked region database.
FIG. 7 is a diagram showing the data structure of a memory region.
FIG. 8 is a table showing the blocked state of small regions on a boundary in a map area.
FIG. 9 is a flowchart showing the processing of a vehicle position calculation unit.

DESCRIPTION OF EMBODIMENTS

An autonomous travel system according to the present invention is described in detail below.

Figure 1:
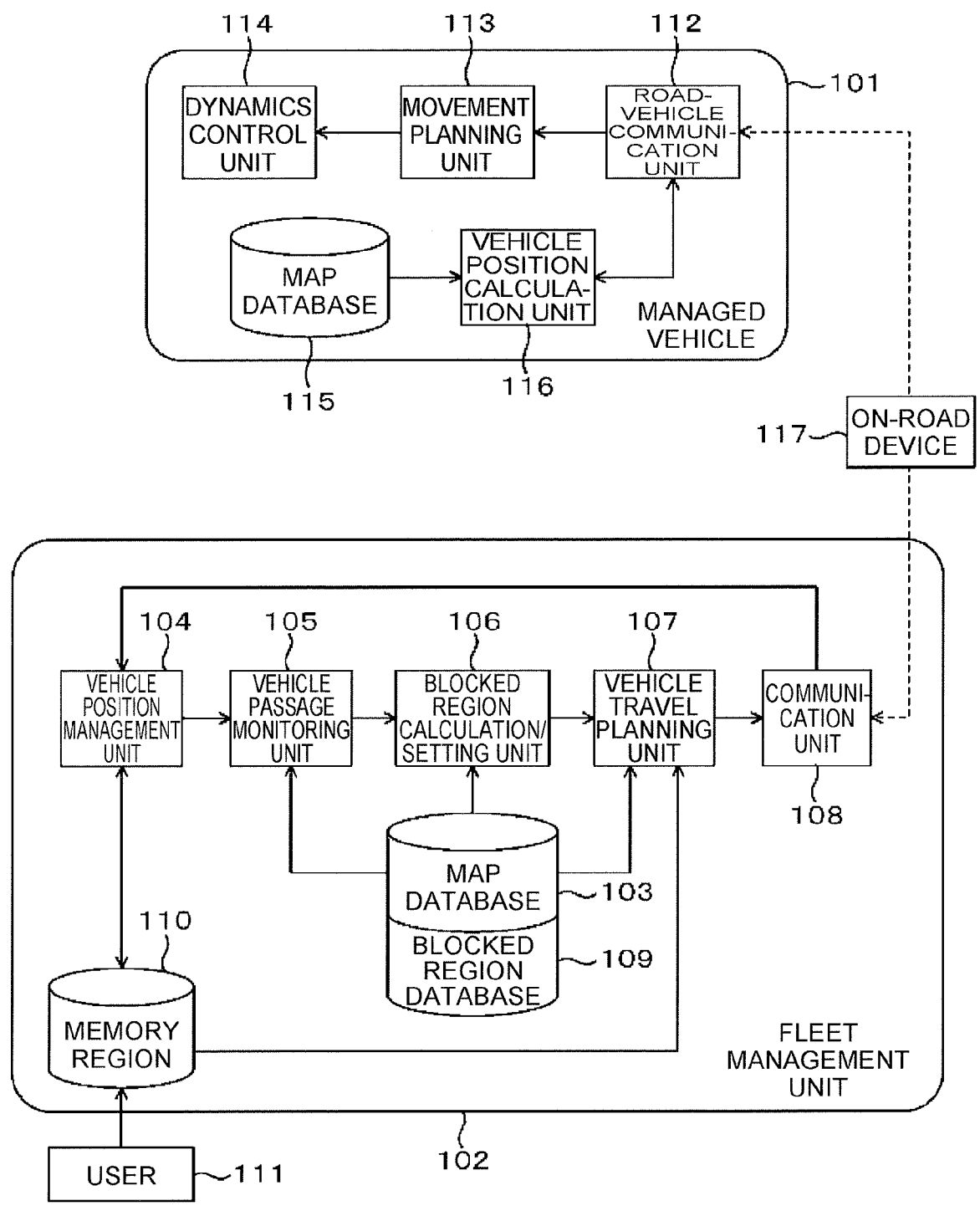
FIG. 1 is a diagram showing the general configuration of an autonomous travel system.

FIG. 1 is a diagram showing the configuration of an autonomous travel system described below. The autonomous travel system includes a plurality of managed vehicles 101 and a fleet management unit 102 that is the center for managing the managed vehicles 101. The fleet management unit 102 has a map database 103 in which topological regions and metric regions are mixed. As the data structure of the map database 103, FIG. 2 shows the data structure of a topological region and FIG. 3 shows the data structure of a metric region.

A topological region refers to a region managed by a topological map in which road shapes and road connections are represented by a network of points and lines. In the map data of a topological region, the following are saved: a link ID 201 that uniquely represents a link in the topological map, a link start point 202 that represents the start coordinates of a link represented by the link ID 201, a link end point 203 that represents the end coordinates of a link represented by the link ID 201, a number of link divisions 204 that represents the number of sub-links created by dividing a link represented by the link ID 201, a sub-link ID 205 that uniquely represents each of the sub-links created by dividing a link represented by the link ID 201, and a sub-link start point 206 and a sub-link end point 207 that represent the start point coordinates and end point coordinates of each sub-link respectively.

A metric region, a region represented independently of a topological region, refers to a region managed by a metric map that represents a space, such as road shapes, in which a vehicle can travel. In the map data of a metric region, the following are saved: a metric ID 301 that uniquely represents a metric region in the map database, a metric shape 302 that represents the shape of a region indicated by the metric ID 301, a number of connection links 303 that is the total number of links connected to the region indicated by the metric ID 301, a connection link 304 that represents the link ID of each link connected to the metric region, a connection node 305 that is the coordinates of a node of the connection link 304 connected to the metric region, and a connection point 306 that represents the coordinates of the connection node 305 in the metric region. In addition, a number of areas 307 that represents the number of areas created by dividing the metric region, indicated by the metric ID 301, into a plurality of regions, an area ID 308 that uniquely indicates each of the areas created by dividing the region indicated by the metric ID 301, and an area shape 309 that represents the shape of the region represented by the area ID 308. An area is a region created by dividing a metric region into a plurality of pieces in advance in such a way that there is no duplication or discontinuity. Each area is, for example, a rectangular region partitioned by the longitude and latitude values.

Figure 4:
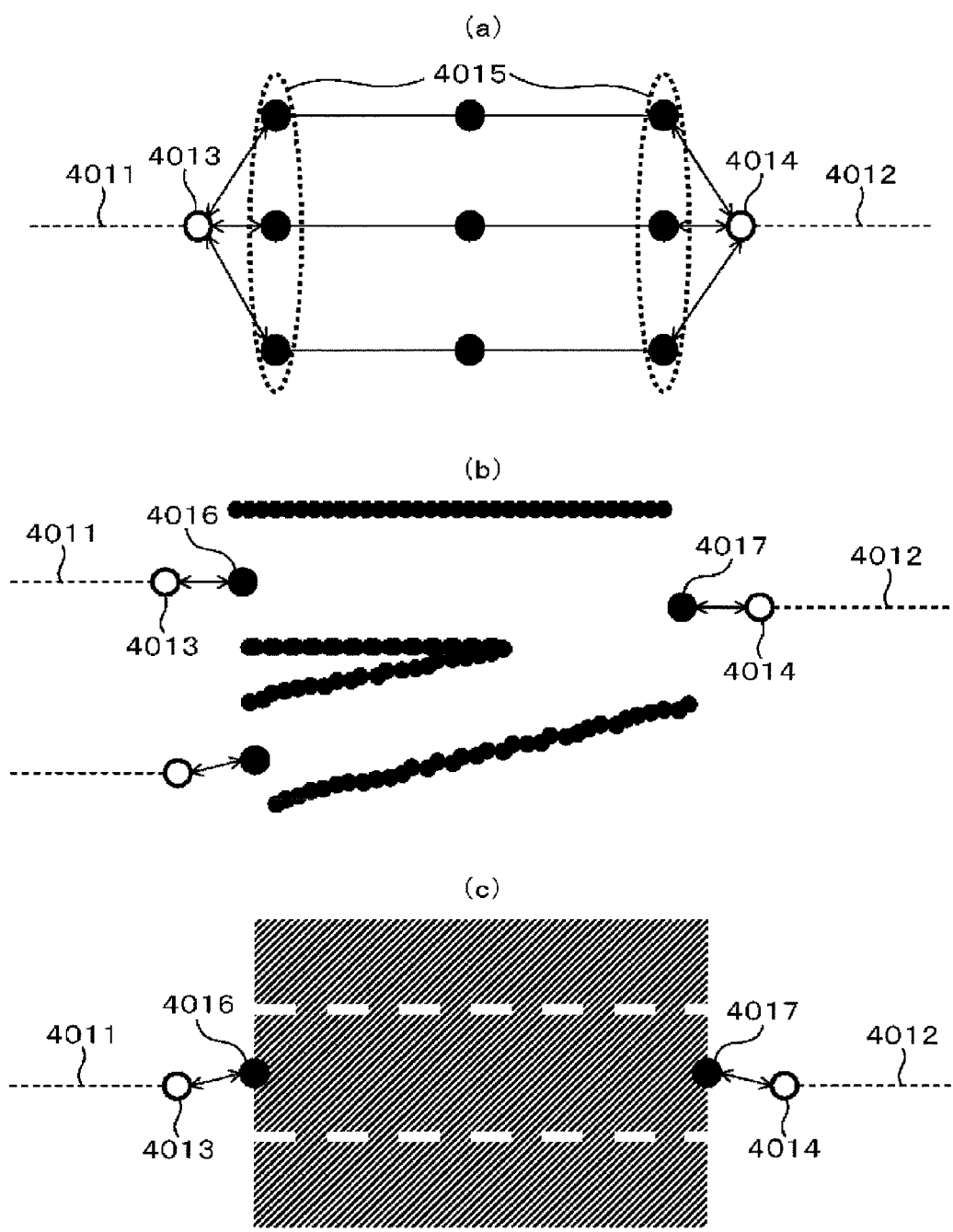
FIG. 4 is a diagram showing examples of the representation method of a map in a metric region.

A part within a region, whose connection to an external topological region is defined by a connection point, is treated as a metric region. FIG. 4 shows examples of the representation of a metric region. Normally, there is only one topological network for a road; however, when there is a plurality of lanes on this road and, reflecting the shapes of the lanes, there are topological networks, one for each lane, as shown in FIG. 4(*a*), this road section can be classified as a metric region. In the DB of metric regions, the IDs of a link 4011 and a link 4012 of the topological region are set as the connection link 304, and a node 4013 and a node 4014 of the topological region are set as the connection node. On the other hand, six nodes 4015, each represented by a black circle and provided for each lane, are set as the connection point. In addition, a map such as the one shown in FIG. 4(*b*), in which the shape of a road or the shape of a travelable region is represented by lines or sequences of points each representing a road end or a boundary end, or a map such as the one shown in FIG. 4(*c*), in which the plane of a travel region is represented by a polygon, is the map representation of a metric region. In the map representation of those metric regions, too, the link of the topological region represented by a dotted line is set in the connection link 304, the node of the topological region represented by a while circle is set in the connection node 305, and the coordinates of a point 4016 and a point 4017 of the metric region, which correspond to the connection node, are set in the connection point 306. In this manner, the connection between the topological region and the metric region is defined.

The fleet management unit 102 includes a vehicle position management unit 104 that periodically saves and updates the position of each managed vehicle 101, a vehicle passage monitoring unit 105 that monitors whether the managed vehicle 101 has passed through the boundary between a topological region and a metric region, a blocked region calculation/setting unit 106 that determines a blocked region that will be described later, a vehicle travel planning unit 107 that plans a future travel path of the managed vehicle 101, a communication unit 108 that performs communication between the fleet management unit 102 and the managed vehicle 101, a blocked region database 109 that stores blocked regions that are set by the blocked region calculation/setting unit 106, and a memory region 110 in which position information on the vehicles is saved. In the memory region 110, a user 111, such as an operation management operator of the fleet management unit 102, can set and store the priority and the destination of each managed vehicle 101 in real time.

FIG. 5 and FIG. 6 show the data structure of the blocked region database 109. FIG. 5 shows the data structure of a blocked region, which is set for a topological region, in the blocked region database 109. For a corresponding topological region, the same value as that of the link ID 201 and the same value as that of the sub-link ID 205 of each sub-link created by dividing the link, both of which are stored in the map database 103, are set in a link ID 501 and a sub-link ID 502, respectively. The identification number of a managed vehicle, which blocks the sub-link represented by each sub-link ID 502, is set in a blocking vehicle number 503. Two or more blocking vehicle numbers 503 may be set for one sub-link ID 502, and they are registered in priority order of managed vehicles. The maximum number of managed vehicles that can be registered is equal to the maximum number of managed vehicles.

FIG. 6 shows the data structure of a blocked region, which is set for a metric region, in the blocked region database 109. For a corresponding metric region, the same value as that of the metric ID 301 and the same value as that of the area ID 308 of each area created by dividing the metric region, both of which are stored in the map database 103, are set in a metric ID 601 and an area ID 602, respectively. The identification number of a managed vehicle, which blocks the area represented by each area ID 602, is stored in a blocking vehicle number 603. Two or more blocking vehicle numbers 603 may be set for one area ID 602, and they are registered in priority order of managed vehicles. The maximum number of managed vehicles that can be registered is equal to the maximum number of managed vehicles.

Each managed vehicle 101 includes a road-vehicle communication unit 112 that performs communication between the fleet management unit 102 and the managed vehicle 101, a movement planning unit 113 that plans the movement of the vehicle based on a travel plan received from the fleet management unit 102, a dynamics control unit 114 that controls the vehicle based on the movement plan of the vehicle, a map database 115 that is the same as the map database 103 of the fleet management unit 102, and a vehicle position calculation unit 116 that calculates the vehicle position using sensors such as the GPS. Communication between the managed vehicle 101 and the fleet management unit 102 is performed via an on-road device 117. The on-road device has the vehicle sensing function such as a monitoring camera or a beacon.

When a plurality of managed vehicles 101 are present near the boundary between a metric region and a topological region, the autonomous travel system with the configuration described above controls the vehicles so that they travel safely and efficiently.

The processing of the autonomous travel system is described below. The managed vehicle 101 sends the position of each vehicle, calculated by the vehicle position calculation unit 116, to the fleet management unit 102 via the road-vehicle communication unit 112. FIG. 9 shows the processing flow of the vehicle position calculation unit 116. In step 901, the information is acquired from the sensors, which collect data for determining the vehicle position, at a periodic interval. The sensors are the GPS, a gyro sensor, an acceleration sensor, and a speed sensor not shown. In step 902, the absolute position expressed in terms of the longitude and latitude is calculated using the acquired sensor information. The absolute position may be calculated not only by directly measuring the position via the GPS but also by correcting the result of dead reckoning navigation, performed by an inertial sensor such as a gyro sensor, an acceleration sensor, or a speed sensor, using the positioning calculation result produced by the GPS and so on.

In step 903, the map data on a position near the calculated absolute position is acquired from the map database 115. In step 904, the managed vehicle 101 confirms whether there is boundary passage information that indicates the passage state of the managed vehicle through the boundary between a topological region and a metric region stored in the map database 115. If there is no boundary passage information, the processing proceeds to step 905. If there is boundary passage information, the processing proceeds to step 906. Here, the boundary passage information on the vehicle is acquired either by receiving the result, obtained by the vehicle passage monitoring unit 105 of the fleet management unit 102, from the road-vehicle communication unit 112 or by receiving the signal from the on-road device 117 via the road-vehicle communication unit 112 wherein the signal informs that the vehicle has passed through the boundary. The on-road device 117, which sends the signal indicating that the vehicle has passed the boundary, is a beacon or a monitoring camera.

In step 905, the vehicle position calculation unit 116 determines whether the vehicle position is included in a metric region. At this time, because there is no boundary passage information, the vehicle position calculation unit 116 determines whether the boundary has been passed according to the absolute position of the vehicle. If the current vehicle position is not in a metric region, the processing proceeds to step 907. If the absolute position is included in a metric region, the processing proceeds to step 908.

On the other hand, in step 906, the vehicle position calculation unit 116 confirms the boundary passage information that indicates whether the vehicle has passed through the boundary. If the boundary passage information is "passed" indicating that the vehicle has passed through the region boundary, the processing proceeds to step 910 next. In step 910, the vehicle position calculation unit 116 confirms whether the vehicle presence position at the previous measuring time is in a topological region. If the region, in which the vehicle was present at the previous measuring time, is in a topological region, the vehicle position calculation unit 116 determines that the current position is included in a metric region and the processing proceeds to step 908. If the region, in which the vehicle was present at the previous measuring time, is in a metric region, the vehicle position calculation unit 116 determines that the current position is included in a topological region and the processing proceeds to step 907. If the boundary passage information is "not passed" in step 906 indicating that the vehicle has not passed through the region boundary, the processing proceeds to step 911. In step 911, the vehicle position calculation unit 116 confirms whether the vehicle presence position at the previous measuring time is in a metric region. If the vehicle presence position at the previous measuring time is in a metric region, the vehicle position calculation unit 116 determines that the current position is included in a metric region and the processing proceeds to step 908; otherwise, the vehicle position calculation unit 116 determines that the current position is present in a topological region and the processing proceeds to step 907.

In step 907, the calculated absolute position is projected on the topological region. The projection of the absolute position on the topological region is performed by dropping a perpendicular from the coordinates of the absolute position, which indicates the current position, to the topological region. In step 908, the absolute position is projected on the metric region. The projection of the absolute position on the metric region is described below for the representation examples of three types of metric region shown in FIG. 4. First, when a metric region is represented using a plurality of topological networks as in the metric region representation in FIG. 4(a), projection is performed by dropping a perpendicular on each of the topological networks in the same manner as on a topological region, and the point, corresponding to the shortest distance between the absolute position and the foot of the projection, is used as the projection point. When the boundary shape of a travel region is represented by the sequences of points as in the metric region representation in FIG. 4(b), a polygon is formed by joining the outermost points of the sequences of points, and the point of projection of the absolute position onto the polygon plane is calculated. Similarly, in the case of the metric region representation in FIG. 4(c), the point at which the absolute position is projected on the polygon plane is calculated. When projecting an absolute position on a polygon plane, the position on the plane can be determined also by matching the surrounding environment shape with the polygon shape if the managed vehicle 101 has the function to measure the surrounding environment.

In step 909, the position of the projection point, calculated in step 907 or step 908, is converted to the coordinates on the map in the map database 115 and the converted coordinates are output as the vehicle position. The vehicle position calculation unit 116 repeats the processing flow described above for serially calculating the vehicle position. The calculated absolute position and vehicle position of each managed vehicle 101 are sent from the road-vehicle communication unit 112 to the communication unit 108 of the fleet management unit 102 via the on-road device 117. At this time, when the boundary passage information is present in the on-road device 117, the absolute position and the vehicle position of each managed vehicle 101, as well as the boundary passage information, are sent to the fleet management unit 102.

In the fleet management unit 102, the communication unit 108 sends the absolute position and the vehicle position of each managed vehicle 101, received from the on-road device 117, to the vehicle position management unit 104. The vehicle position management unit 104 saves the received latest absolute position and vehicle position of the managed vehicle in the memory region 110. When the boundary passage information is received from the on-road device 117, the vehicle position management unit 104 saves the latest absolute position and vehicle position of the managed vehicle, as well as the boundary passage information, in the memory region 110.

FIG. 7 shows the data structure of the memory region 110. Following a total number of managed vehicles 701, a predetermined amount of memory is allocated to each managed vehicle. In this memory, a priority 703, a destination 704, a vehicle position 705 and an absolute position 706 on the map, and boundary passage information 707 of a managed vehicle, all of which are associated with a managed vehicle number 702, are saved. The value of the vehicle position 705 is saved in a previous vehicle position 708 before the vehicle position is updated to the latest information. The information on all managed vehicles 101 is integrated in the memory region 110. The user 111 determines the priority 703 and the destination 704 of each managed vehicle in advance. The user may change, set, and save them later in real time.

After saving the information, received from each managed vehicle, in the memory region 110, the vehicle position management unit 104 sends a message to the vehicle passage monitoring unit 105 to indicate that the information on the managed vehicle has been updated. The vehicle passage monitoring unit 105 references the value of the position of each managed vehicle and the value of the boundary passage information, saved in the memory region 110, to check if the managed vehicle has passed through the boundary. If there is a conflict among the latest vehicle position received from the managed vehicle 101, the previous vehicle position, and the boundary passage information, the vehicle passage monitoring unit 105 corrects the vehicle position assuming that the value of the boundary passage information is correct.

Figure 10:
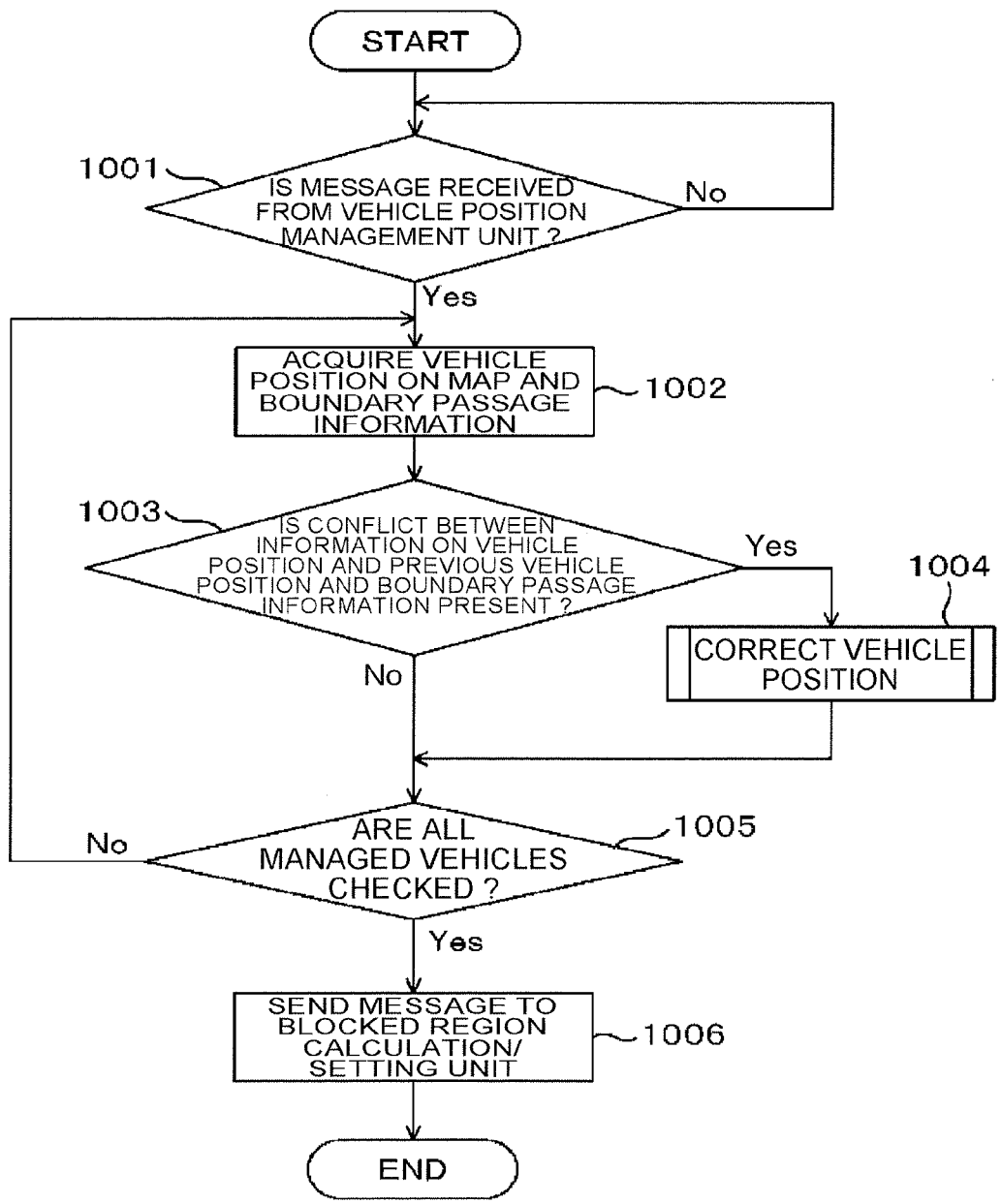
FIG. 10 is a flowchart showing the processing of a vehicle passage monitoring unit.

FIG. 10 shows the processing flow of the vehicle passage monitoring unit 105. The vehicle passage monitoring unit 105 always keeps waiting for a message from the vehicle position management unit 104 (step 1001). When a message is received, the processing proceeds to step 1002. In step 1002, the vehicle passage monitoring unit 105 acquires the information on the vehicle position 705, boundary passage information 707, and previous vehicle position 708 for one of the managed vehicles saved in the memory region 110 but not yet checked. In step 1003, the vehicle passage monitoring unit 105 checks if there is a conflict between the regions, in which the vehicle position and the previous vehicle position of the managed vehicle are present, and the boundary passage information. This conflict may be generated, for example, when the vehicle position calculation unit 116 of the managed vehicle 101 calculates the vehicle position without being able to receive the information from the on-road device 117 and when the fleet management unit 102 can receive the information from the on-road device 117. If there is a conflict between the vehicle position of the managed vehicle saved in the memory region 110 and the boundary passage information, the processing proceeds to step 1004 assuming that the vehicle position is incorrect. If there is no conflict, the processing proceeds to step 1005. In step 1004, the fleet management unit 102 corrects the vehicle position because the vehicle position, calculated by the managed vehicle 101, is incorrect.

Figure 11:
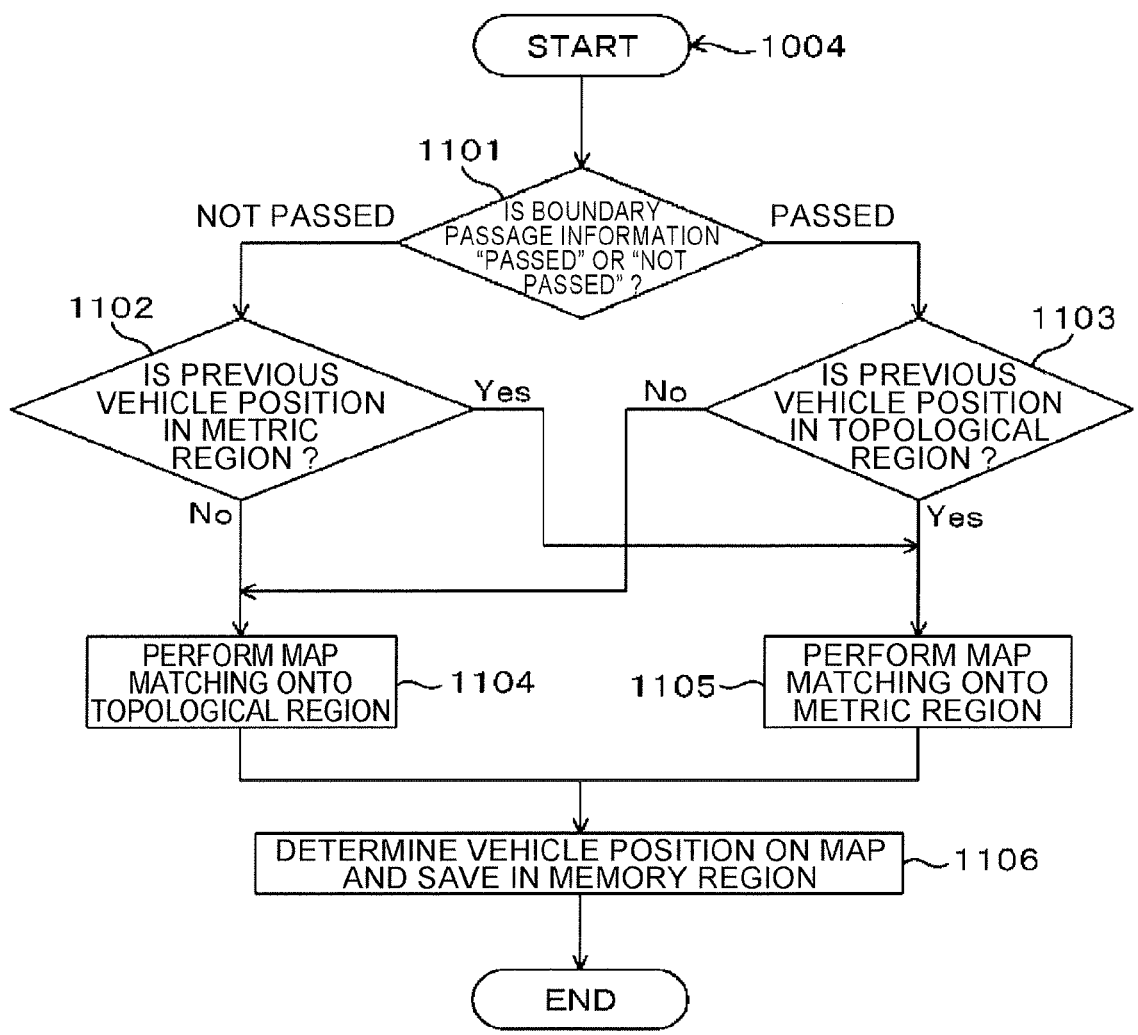
FIG. 11 is a flowchart showing the determination processing of a managed vehicle position.

FIG. 11 shows the processing flow of the processing for correcting the vehicle position of a managed vehicle. First, in step 1101, the vehicle passage monitoring unit 105 determines the boundary passage information. If the boundary passage information is "passed", the processing proceeds to step 1103 to determine whether the previous vehicle position is included in a topological region. If it is determined that the previous vehicle position is included in a topological region (step 1103: Yes), the processing proceeds to step 1105. If it is determined that the previous vehicle position is included in a metric region (step 1103: No), the processing proceeds to step 1104. If the boundary passage information is "not passed" in step 1101, the processing proceeds to step 1102 to determine whether the previous vehicle position is included in a metric region. If it is determined that the previous vehicle position is included in a metric region (step 1102: Yes), the processing proceeds to step 1105. If it is determined that the previous vehicle position is included in a topological region (step 1102: No), the processing proceeds to step 1104.

The map matching processing for the vehicle position in the topological region in step 1104 and the map matching processing for the vehicle position in the metric region in step 1105 are performed in the same manner as in step 907 and step 908 of the vehicle position calculation unit 116, respectively. In step 1106, the vehicle position, calculated in step 1104 or step 1105, is written in the vehicle position in the memory region 110 for correcting the vehicle position.

Returning to the description of the processing flow in FIG. 10, in step 1005, the vehicle passage monitoring unit 105 compares the total number of managed vehicles 701, saved in the memory region 110, with the number of managed vehicles 101 that have been checked to determine if all managed vehicles 101 are checked. If all managed vehicles 101 are checked, the processing proceeds to step 1006. If there are one or more unchecked managed vehicles 101, the processing returns to step 1002. In step 1006, the vehicle passage monitoring unit 105 sends a message to the blocked region calculation/setting unit 106 to indicate that all managed vehicles 101 are checked.

The blocked region calculation/setting unit 106 calculates blocked regions, which are to be set for each managed vehicle in the map database 103, from the vehicle positions of all managed vehicles 101, saved in the memory region 110, and the map information stored in the map database 103. After that, the blocked region calculation/setting unit 106 sets the calculated results in the blocked region database 109.

Figure 12:
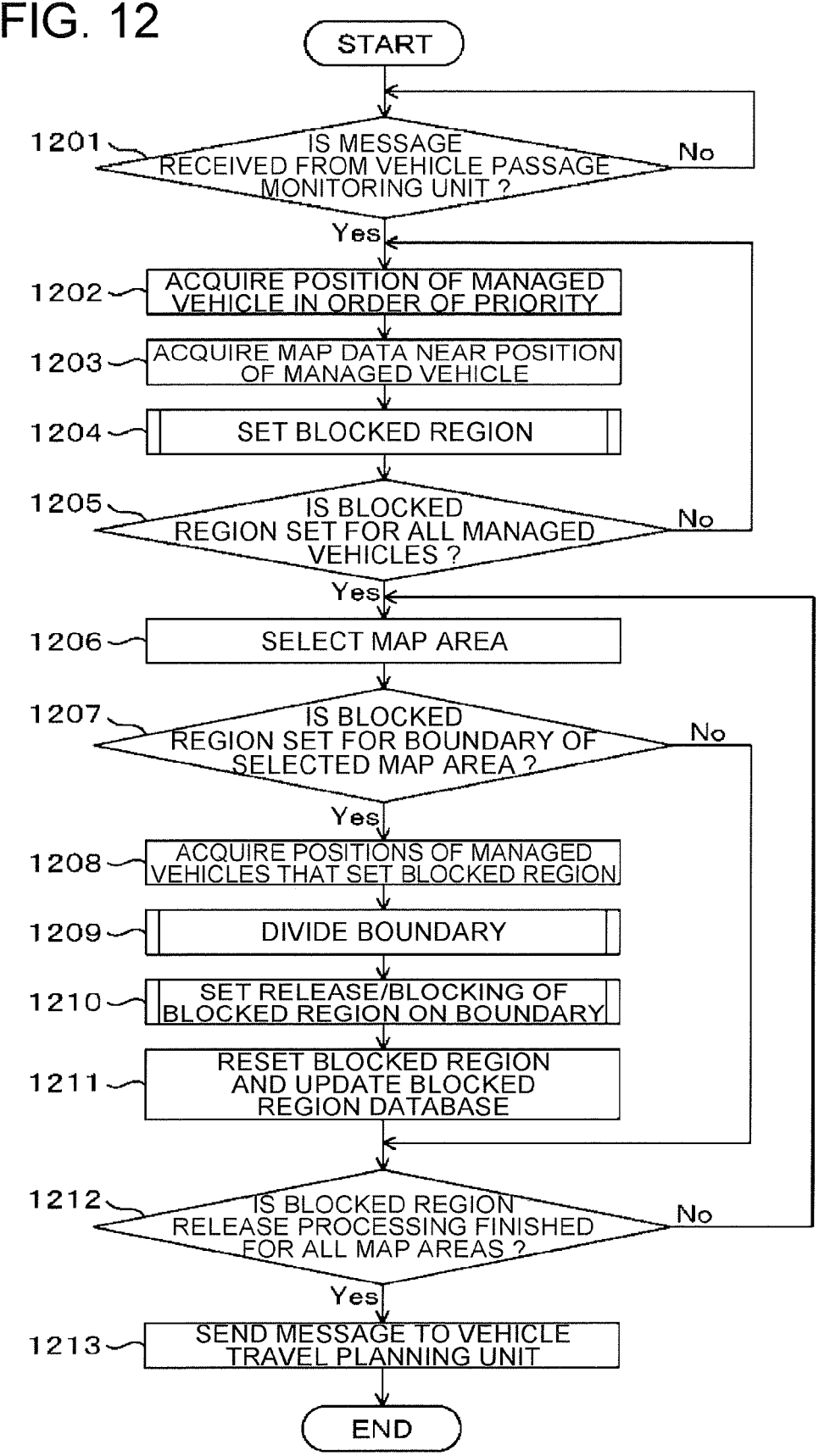
FIG. 12 is a flowchart showing the processing of a blocked region calculation/setting unit.

FIG. 12 shows the processing flow of the blocked region calculation/setting unit 106. In step 1201, the blocked region calculation/setting unit 106 checks if a message is sent from the vehicle passage monitoring unit 105. If a message is not received, the blocked region calculation/setting unit 106 waits until time comes again for checking the reception of a message. If a message is received, the processing proceeds to step 1202. In step 1202, the blocked region calculation/setting unit 106 acquires the vehicle position 705 and the absolute position 706 of the managed vehicle 101 from the memory region 110 in order of the priority 703 and then the processing proceeds to step 1203. In step 1203, the blocked region calculation/setting unit 106 acquires the map data on a position near the current position of the managed vehicle from the map database 103 using the information on the vehicle position 705 of the managed vehicle acquired in step 1202 and, then, the processing proceeds to step 1204. In step 1204, the blocked region calculation/setting unit 106 sets a blocked range on the map data near the managed vehicle, acquired in step 1203, for the vehicle position 705 of the managed vehicle acquired in step 1202 and, after that, saves the blocked range in the blocked region database 109 as a blocked region.

Figure 13:
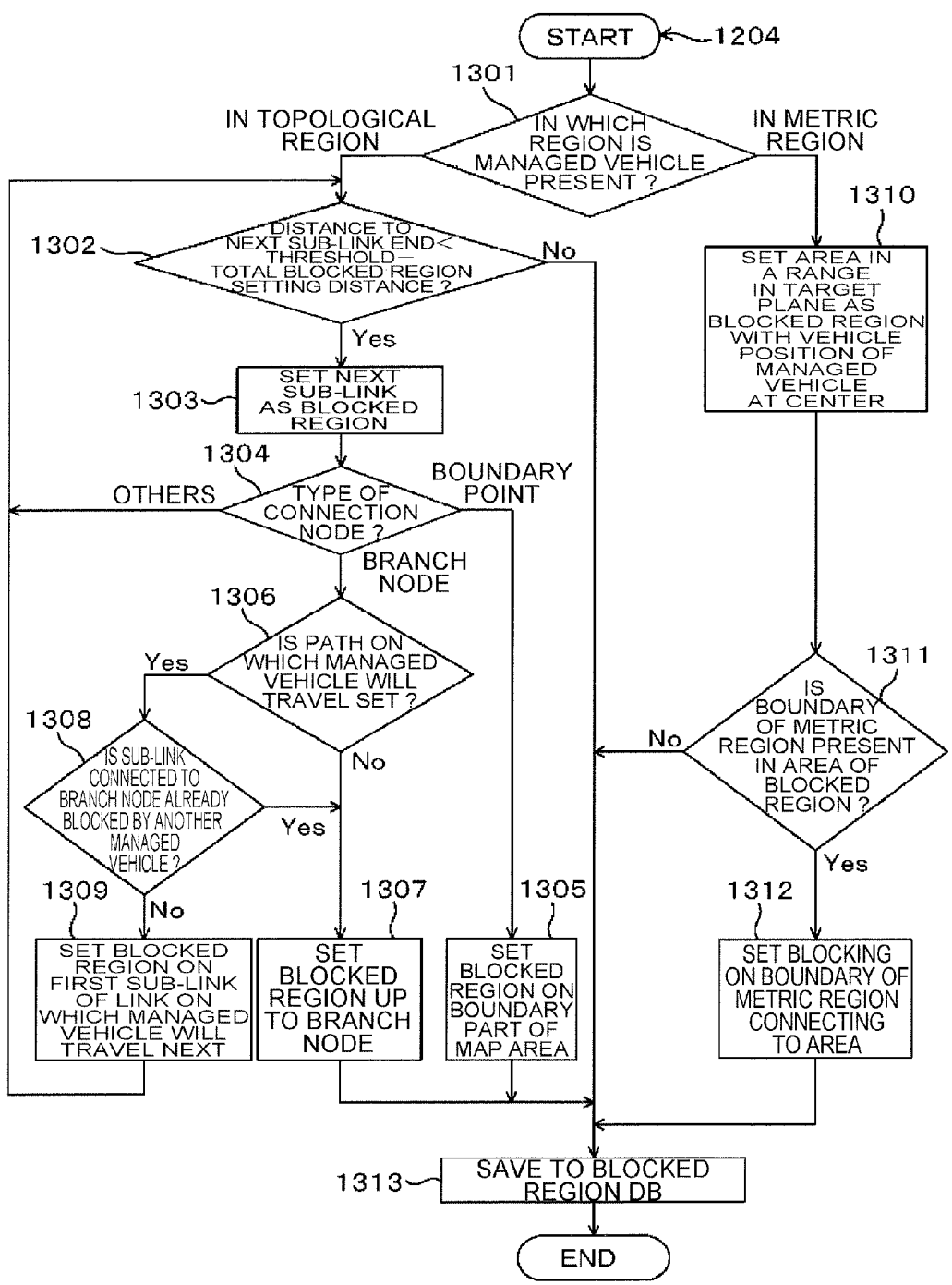
FIG. 13 is a flowchart showing the processing for setting a blocked region.

FIG. 13 shows the detailed processing flow of blocked region setting in step 1204. In step 1301, the blocked region calculation/setting unit 106 determines whether the region, in which the vehicle position 705 of the managed vehicle 101 is present, is a topological region or a metric region. If the vehicle position 705 of the managed vehicle 101 is present in a topological region, the processing proceeds to step 1302. If the vehicle position 705 of the managed vehicle 101 is present in a metric region, the processing proceeds to step 1310.

In step 1302, the blocked region calculation/setting unit 106 determines whether the value generated by subtracting the total blocked region setting distance, which is the distance over which a blocked region is already set from the vehicle position of the managed vehicle, from the threshold that is the value of the maximum distance when a blocked region is set (that is, the remaining distance over which a blocked region can be set) is longer than the distance from the end point of the sub-link included in the already-set blocked region to the end point of the next sub-link. The total blocked region setting distance can be calculated by calculating the sum of the lengths of the sub-links for which a blocked region is already set. If the remaining distance over which a blocked region can be set is longer than the distance to the end point of the next sub-link, the processing proceeds to step 1303. If the remaining distance over which a blocked region can be set is shorter than the distance to the end point of the next sub-link, the processing proceeds to step 1313 because the next sub-link can no longer be added to the blocked region.

In step 1303, the sub-link, which is a sub-link next to the sub-link already included in the blocked region, is set as a blocked region and this sub-link is added to the blocked region, and the processing proceeds to step 1304. In step 1304, the blocked region calculation/setting unit 106 determines whether the end-point node of this sub-link, newly added to the blocked region, is a branch node or a connection node that is the boundary point of a map area. If the end point of the sub-link is a boundary point that is present on the boundary of a map area, the processing proceeds to step 1305. If the end point of the sub-link is a branch node at which a link branch occurs, the processing proceeds to step 1306. If the end point of the sub-link is neither a branch node nor the boundary point of a map area, the processing returns to step 1302.

In step 1305, because the boundary of a map area overlaps with the blocked region, the boundary point of the topological region and the boundary side of the connected metric region are set as a blocked region and the processing proceeds to step 1313. In step 1306, the blocked region calculation/setting unit 106 determines whether a travel path, on which the managed vehicle is to travel (or, at least the next link to which the managed vehicle 101 will travel), is set by the fleet management unit 102. If a travel path on which the managed vehicle 101 will travel in future is not set for the managed vehicle 101, the link on which the managed vehicle 101 will travel next is not identified and, therefore, the extension of the blocked region is stopped and the processing proceeds to step 1307. If a travel path on which the managed vehicle will travel is set, the processing proceeds to step 1308. In step 1307, blocking is closed at the node for which a blocked region is set last, and the processing proceeds to step 1313.

In step 1308, the blocked region calculation/setting unit 106 confirms the links connected to the branch node to check whether there is a sub-link which is one of the sub-links connected to the branch node and for which a blocked region is already set by another managed vehicle (that is, a managed vehicle having a higher priority). If an already-blocked sub-link is connected to the branch node, the blocked region neighbors on another blocked region at this branch node and, therefore, the processing proceeds to step 1307 without extending the blocked region any more. On the other hand, any sub-link connected to the branch node is not blocked, the processing proceeds to step 1309. In step 1309, a blocked region is set for the first sub-link of the next-connected link according to the travel path of the managed vehicle 101 extending from the branch node, and the processing proceeds to step 1302.

Next, the following describes the processing performed when it is determined in the determination in step 1301 that the vehicle position of the managed vehicle is included in a metric region. In step 1310, an area included in a range, centered on the position of the managed vehicle 101, is selected, the selected area is set as a blocked region and, then, the processing proceeds to step 1311. In this case, the shape of the range is one continuous planar shape such as a circle, an ellipse, a rectangle, or a polygon.

In step 1311, the blocked region calculation/setting unit 106 determines whether there is the boundary of the metric region in the area that is set as a blocked region. Whether there is the boundary of the metric region in the area is determined by checking if the connection point 306 is included in this area. If there is not the boundary of the metric region in the area that is set as a blocked region, the processing proceeds to step 1313. However, if there is the boundary of the metric region in the area that is set as a blocked region, the processing proceeds to step 1312. In step 1312, the boundary of the metric region included in the area, which is set as a blocked region, is set as the boundary of the blocked region, the region including the inside of the metric region that includes the end of the plane is re-set as a blocked region, and the processing proceeds to step 1313. In step 1313, the blocked region that is set and the managed vehicle number of the managed vehicle are saved in the blocked region database 109 and the processing is terminated.

Basically, in the processing described above, for a managed vehicle in a topological region, a blocked region is set on a link, which is ahead of the vehicle position and on which the vehicle is to travel, on a sub-link basis within a predetermined-distance range and, for a managed vehicle in a metric region, a blocked region is set in a predetermined shape. For a managed vehicle that is present near a topological region and a metric region, a blocked region is set in the boundary part of these regions.

Returning to the description of FIG. 12, after the blocked region is set in step 1204, the blocked region calculation/setting unit 106 determines in step 1205 whether a blocked region is set for all managed vehicles 101. If a blocked region is set for all managed vehicles 101, the processing proceeds to step 1206. If there is one or more managed vehicles 101 for which a blocked region is not yet set, the processing returns to step 1202 to repeat the processing for the remaining managed vehicles.

Next, in step 1206, a map area is selected from the map database 103 and the processing proceeds to step 1207. The selection order of map areas may be determined in advance. In step 1207, the blocked region calculation/setting unit 106 references the blocked region database 109 to determine whether a blocked region is set for the boundary part of the map area selected in step 1206. If a blocked region is not set for the boundary of the map area, the processing proceeds to step 1212. If a blocked region is set for the boundary of the map area, the processing proceeds to step 1208. In step 1208, for all managed vehicles which set a blocked region for the boundary of that map area and whose vehicle position is present in a topological region, all vehicle positions and the managed vehicle numbers 702 thereof are acquired from the blocked region database 109, and the processing proceeds to step 1209. In step 1209, based on the vehicle position of the managed vehicle 101 that is one of those acquired in step 1208 and that is present in a section within the topological region and is nearest to the boundary of the map area, the blocked region that is set in divided into a plurality of regions and the processing proceeds to step 1210.

Figure 14:
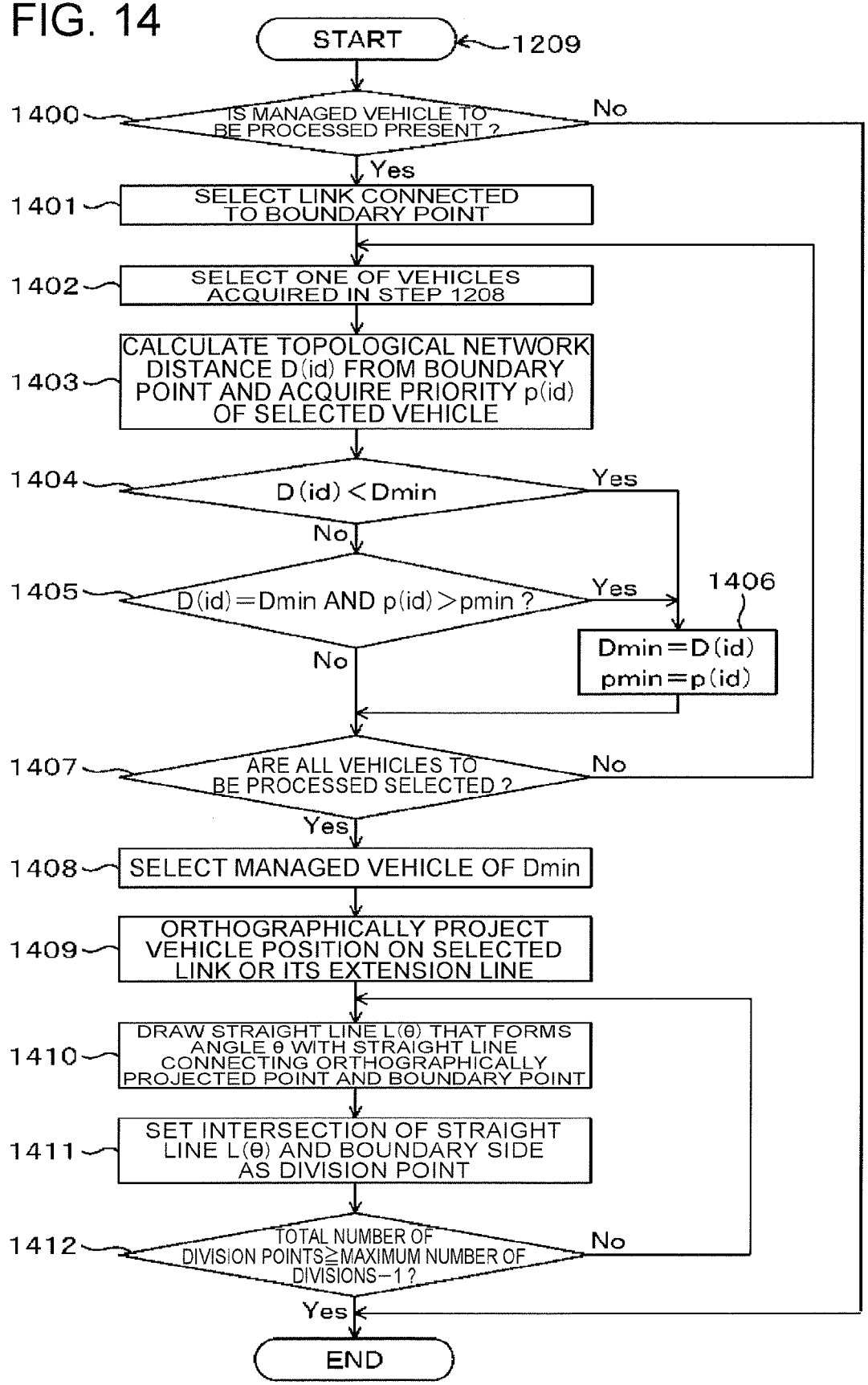
FIG. 14 is a flowchart showing boundary division.
Figure 15:
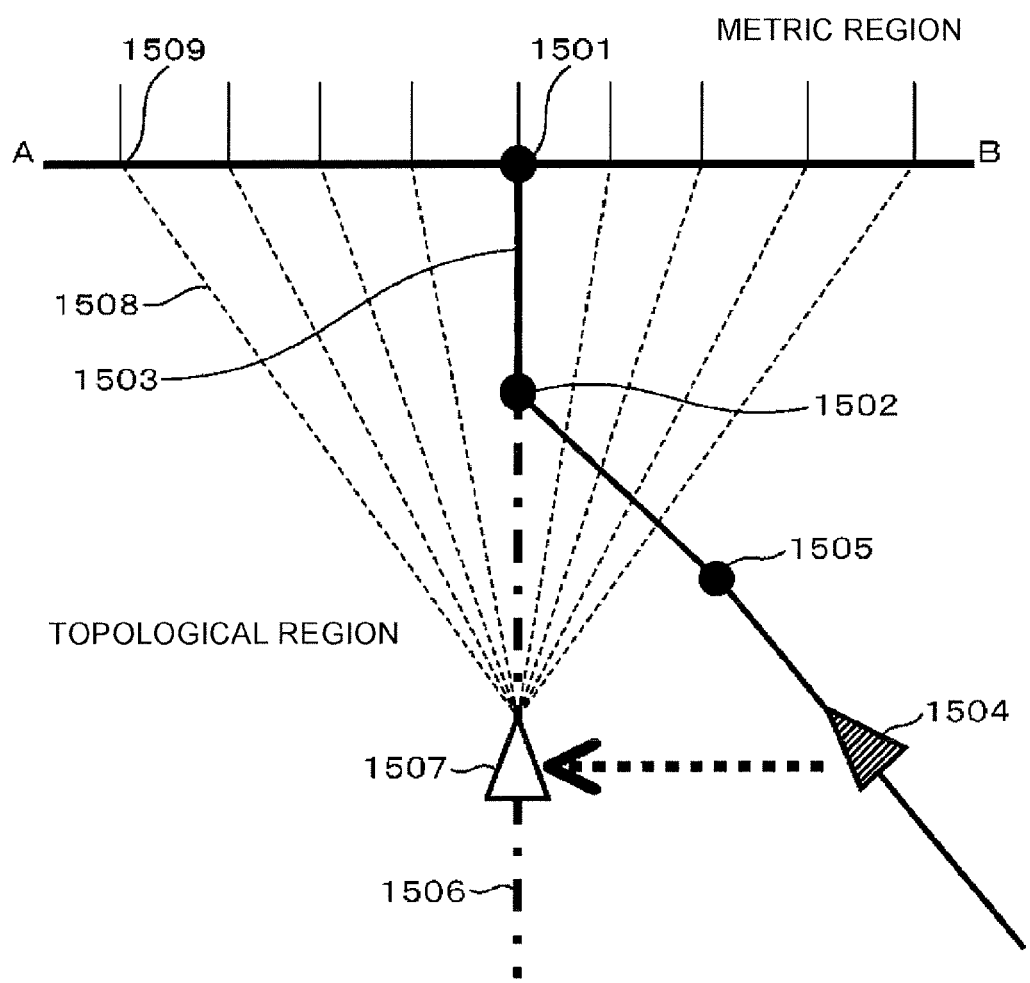
FIG. 15 is a diagram showing boundary division in a map area.

FIG. 14 shows the flowchart of the blocked region division processing performed in step 1209. FIG. 15 shows an example of blocked region division. In step 1400, the blocked region calculation/setting unit 106 checks if a managed vehicle to be processed is acquired. If there is no managed vehicle to be processed, that is, if there is no managed vehicle in the topological region side, the blocked region calculation/setting unit 106 terminates the processing without further dividing the blocked region. Next, in step 1401, a link is selected, which is connected to a boundary point registered as a blocked region of the region boundary to be processed and which is included in the topological region side and, then, the processing proceeds to step 1402. The link connected to the boundary point is obtained by searching the map database 103. In the example shown in FIG. 15, a node 1501 on the region boundary side AB in the region is the boundary point, and the link connected to the boundary point and included in the topological region side is a link 1503 that has the node 1501 and a node 1502 as the ends. In step 1402, one managed vehicle is selected from all managed vehicles, which are selected in step 1208 and which set a blocked region in this region boundary, in ascending order of managed vehicle numbers. In step 1403, the priority 703 (p(id)) and the topological network distance (D(id)) of the selected managed vehicle (managed vehicle number=id) are calculated, and the processing proceeds to step 1404. The topological network distance is the sum of link distances from the boundary point to the position on the topological network of the managed vehicle to be processed. In FIG. 15, when the selected vehicle is indicated by the reference number 1504, the topological network distance is the sum of the distance from the node 1501 to the node 1502, the distance from the node 1502 to a node 1505, and the distance from the node 1505 to the position of a managed vehicle 1504.

In step 1404, the blocked region calculation/setting unit 106 determines whether the topological network distance D(id), calculated in step 1403, is smaller than the minimum value (Dmin) of the topological network distances calculated so far in this processing. If the value of D(id) is equal to or larger than Dmin, the processing proceeds to step 1405; if the value is smaller than Dmin, the processing proceeds to step 1406. In step 1405, the blocked region calculation/setting unit 106 determines whether the topological network distance D(id), calculated in step 1403, is equal to the minimum value Dmin of the topological network distances calculated so far and whether the priority 703 (p(id)) of the selected vehicle acquired in step 1403 is higher than the priority 703 (pmin) of the managed vehicle whose topological network distance is the minimum of the topological network distances calculated so far. If this determination result is true, the processing proceeds to step 1406. If the topological network distance of the selected vehicle is larger than the topological network distance calculated so far or if the priority 703 is low, the processing proceeds to step 1407. In step 1406, the topological network distance, calculated in step 1403, is stored as the minimum distance, the managed vehicle number and its priority 703 are stored, and the processing proceeds to step 1407. Prior to this processing, it is assumed that Dmin and pmin are initialized to the appropriate values. In step 1407, the blocked region calculation/setting unit 106 determines whether all managed vehicles to be processed are selected and the processing is completed for those managed vehicles. If the processing is performed for all managed vehicles to be processed, the processing proceeds to step 1408; if there are one or more managed vehicles to be processed, the processing returns to step 1402 to repeat the processing.

In step 1408, the vehicle number of the vehicle, whose topological network distance from the boundary point is the minimum, is selected and the processing proceeds to step 1409. In step 1409, the point is calculated at which the vehicle position of the managed vehicle, selected in step 1408, is orthographically projected on the link, which is selected in step 1401 and connected to the boundary point, or on its extension line, and the processing proceeds to step 1410. In FIG. 15, a point 1507 is calculated at which the position of the selected managed vehicle 1504 is orthographically projected on the link 1503, connected to the boundary point, or on its extension line 1506. In step 1410, with the orthographically projected point as its center, a straight line L(θ) is obtained which forms a predetermined angle θ with the link, connected to the boundary point, or with its extension line, and the processing proceeds to step 1411. In FIG. 15, with the point 1507, created by orthographically projecting the position of the managed vehicle 1504, as its center, a straight line 1508 is obtained that forms a predetermined angle with the line 1506. In step 1411, the intersection point between the straight line L(θ), obtained in step 1410, and the boundary side, on which a blocked region is set, is obtained, the intersection point is set as a division point, and the processing proceeds to step 1412. At this time, if the straight line does not intersect with the boundary side, an impossible value is set for the division point. In FIG. 15, an intersection point 1509 between the straight line 1508 and the boundary side AB is obtained. In step 1412, the processing is terminated when the total number of division points is larger than a predetermined maximum number of division points. If the total number of division points is smaller than a predetermined maximum number of division points, the processing returns to step 1410 and the processing from step 1410 to step 1412 is repeated. When the angle θ is equal in all cases, this method allows the small regions of a distant boundary to be divided into large pieces, and the small regions of a near boundary into small pieces. The boundary side can be divided simply into pieces of equal size by changing the angle θ according to the distance between the selected vehicle position and the boundary side.

Returning to the description of the flow in FIG. 2, the following processing is performed in step 1210. That is, considering the position of the managed vehicle 101 near the boundary of a map area acquired in step 1208, the release/blocking of a blocked region on the boundary of a map area, defined as one or more small regions through the boundary division processing in step 1209, is set. After that, the processing proceeds to step 1211.

Figure 16:
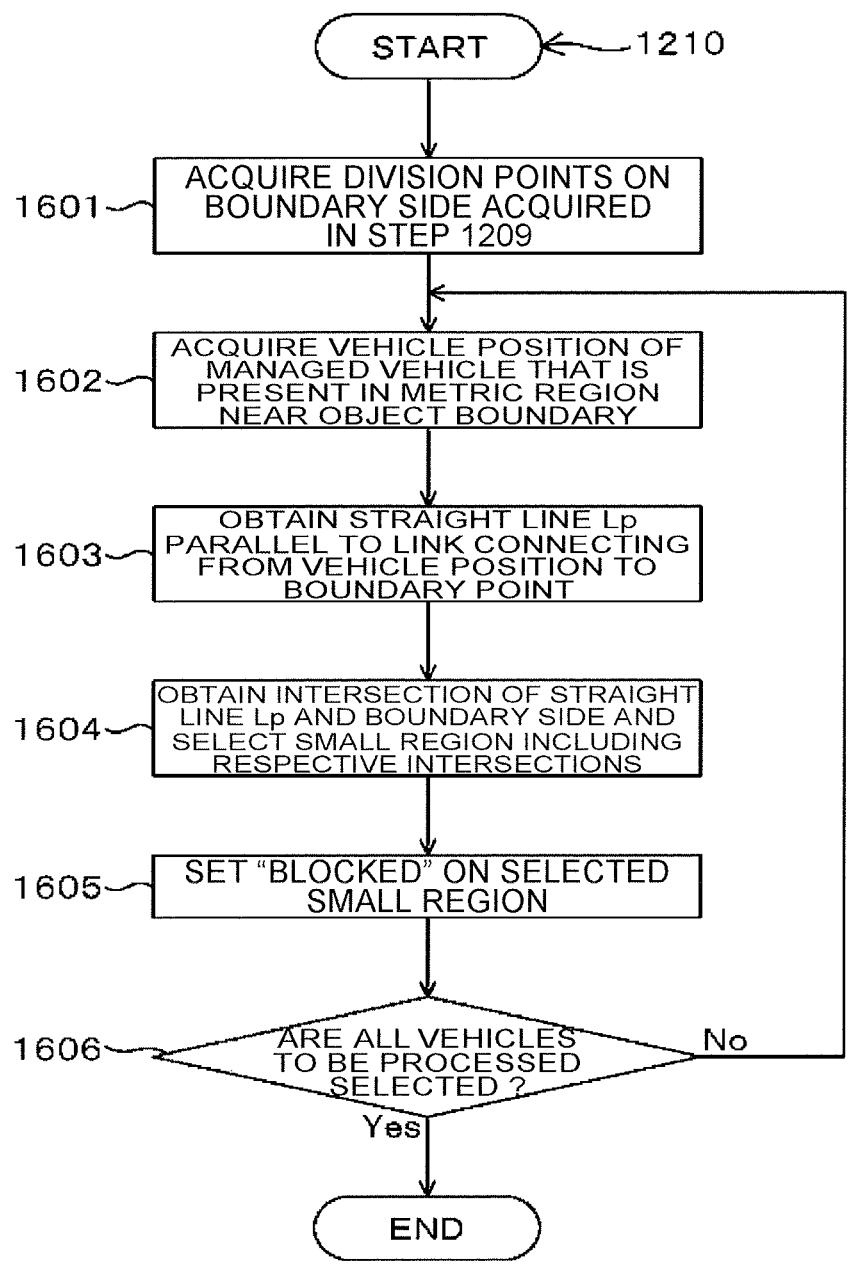
FIG. 16 is a flowchart showing processing for releasing the blocked state of a small region on a boundary in a map area.

FIG. 16 shows the flow of the processing in step 1210 in which the blocked state of each blocked region on a map area boundary is released on a small region basis. In step 1601, the division points on a boundary side, which are set in step 1209, are acquired. A small region is a region between these division points on the boundary side. If the boundary side is not divided by the processing in step 1209, the ends of the boundary side are assumed as division points and the boundary side itself is treated as a small region. After that, the table shown in FIG. 8 is created for the small region. In this table, the serial numbers of small regions are set in a column 801 in the order in which the small regions are acquired. In each row, the coordinates of a start point 802 and an end point 803 of each small region are set. For those coordinates, the coordinates of the division points at both ends of a small region are used. A blocked state 804 of each small region is set. Initially, the blocked state 804 is set to "unblocked" in all rows.

Next, in step 1602, one managed vehicle, which is present in a metric region, is selected from the vehicles near the blocked region acquired in step 1208, the vehicle position is acquired, and the processing proceeds to step 1603. In step 1603, a straight line Lp, which is parallel to the link that is connected to the boundary point and is in the topological region side, is drawn from the vehicle position of the managed vehicle selected in step 1602, and the processing proceeds to step 1604. In step 1604, the intersection point between the straight line Lp and the boundary side is obtained, the number of the small region including that intersection point is selected, and the processing proceeds to step 1605. In step 1605, the blocked state 804 in the row of the small region number 801 acquired in step 1604 is set to "blocked" and the processing proceeds to step 1606. In step 1606, it is determined whether all vehicles, which are present in the metric region, are selected from the vehicles acquired in step 1208 and the processing from step 1602 to step 1605 is performed is determined. If all vehicles to be processed are selected, the processing is terminated. If there are one or more vehicles not yet selected, the processing returns to step 1602 to repeat the processing.

In this manner, the boundary side of a map area is divided into a plurality of small regions based on the positional relation between a managed vehicle, which is approaching the boundary side and is in the topological region side, and the boundary line, and the length of each of the small regions is determined.

Figure 17:
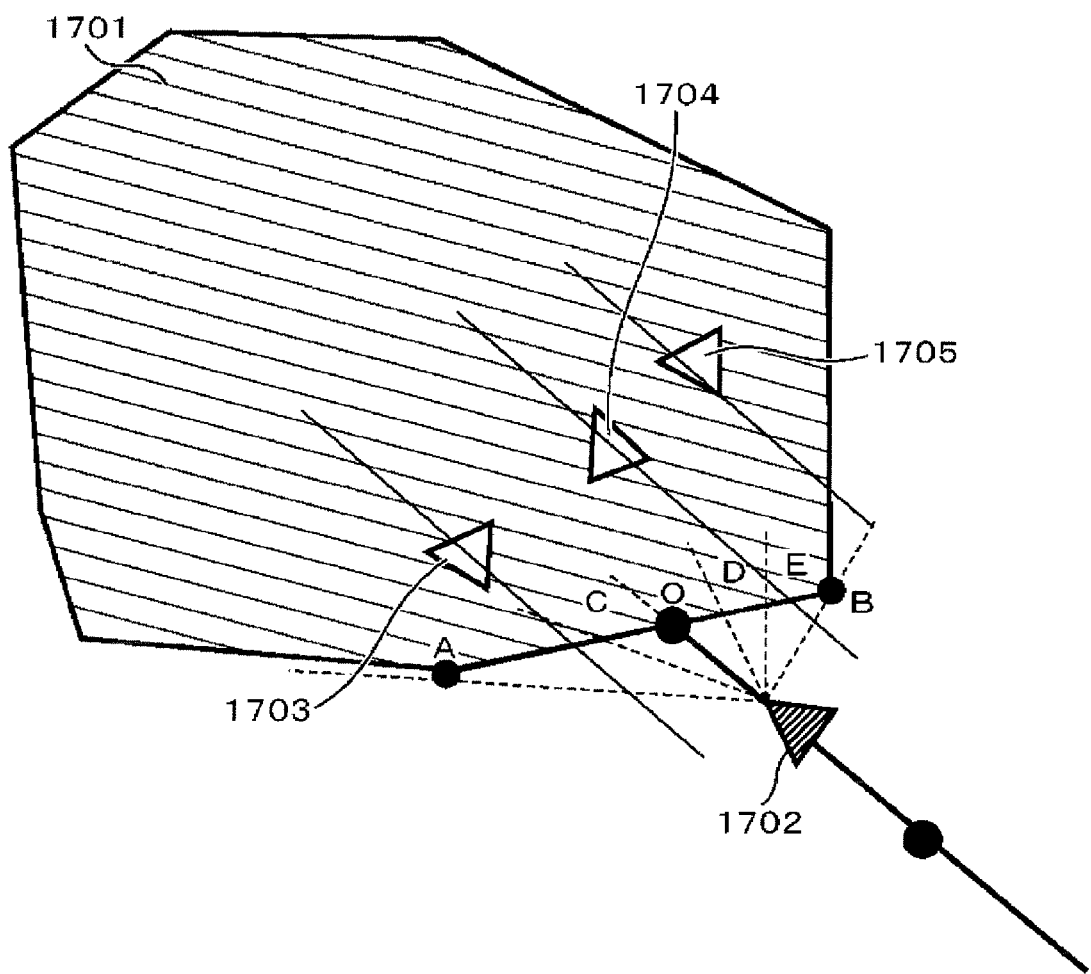
FIG. 17 is a diagram showing the release of a blocked state in a small region.

FIG. 17 shows an example of the processing shown in FIG. 16. It is assumed that the side AB of a plane 1701 in a metric region is a boundary side and that a blocked region has been set on this boundary side by the processing in step 1204. It is also assumed that the boundary side AB is divided into five small regions, AC, CO, OD, DE, and EB, by a managed vehicle 1702 in the topological region during the processing in step 1209. In addition, when the managed vehicles in the metric region section, which are acquired by the processing in step 1602, are three vehicles, 1703, 1704, and 1705, a line that is parallel to the topological network link connected to the boundary point O is drawn from each of the managed vehicles. In this case, the small regions, each of which includes a point at which the parallel line intersects with the side AB, are a blocked region. In the example shown in FIG. 17, because the boundary side and the parallel lines intersect in the small regions AC and EB, "blocked" is set in the blocked state of those small regions.

Returning again to the description of the flow in FIG. 12, the following processing is performed in step 1211. That is, a blocked region is released also for a metric region in a range within a predetermined distance from a line whose end points are the coordinates of the start point 802 and the end point 803 of a small region that is released from the blocked state with "unblocked" stored in the blocked state. After that, the blocked regions in the metric region are re-set, the region database is updated, and the processing proceeds to step 1212. The shape of a blocked region to be released may be a circle, an ellipse, a rectangle, or a polygon that includes a line whose end points are the coordinates of the start point 802 and the 803 of a small region.

In step 1212, the blocked region calculation/setting unit 106 determines whether the release of blocked regions on a boundary in all map areas is terminated. If the release of blocked regions on a boundary in all map areas is terminated, the processing proceeds to step 1213. If there are one or more map areas in which the release of blocked regions is not terminated, the processing returns to step 1206 to repeat the processing. After that, a message indicating that the blocked region release processing is terminated is sent to the vehicle travel planning unit 107 in step 1213.

If the boundary point on the boundary between a topological region and a metric region and the corresponding boundary side are all blocked, any vehicle cannot pass through the boundary. This sometimes result in stopping a vehicle that may normally enter a region or result in issuing a bypass instruction to a vehicle that need not travel in a bypass path. To prevent this, the system described above divides a boundary side, on which a blocked region is set, into a plurality of regions so that the blocked state of blocked regions can be set more flexibly and the blocked state of a region, in which there is no vehicle, can be released. Therefore, on a boundary where the map representation method changes from topological to metric or vice versa, the system ensures safe operation of a moving object and prevents operation efficiency from being decreased.

The vehicle travel planning unit 107 receives a message from the blocked region calculation/setting unit 106 and plans the travel path of a managed vehicle using the information on the vehicle position of each managed vehicle, saved in the memory region 110, and the information stored in the map database 103 and the blocked region database 109. A travel path plan is represented by a sequence of passage points corresponding to a travel path from the vehicle position of a managed vehicle in a blocked region, which is set by each managed vehicle, to the destination or the blocked region end point that is set for the managed vehicle. In a topological region, the positions of the nodes included in a travel path are arranged in order of passage. On the boundary line of a map area in a metric region and in a metric region, the target points (waypoints), through which a vehicle passes for each predetermined distance, are defined and their positions are arranged in order of passage. If there is a boundary point in a blocked region, which is set by the blocked region calculation/setting unit 106, on the boundary side of a map area, the position of the boundary point, that is, the position of the end point of a link connected to a metric region, is moved to a small region if blocked state is not set for the small region on the boundary side of the metric region and, then, the point is registered as a passage point. The registered passage points are sent to each vehicle via the communication unit 108.

Figure 18:
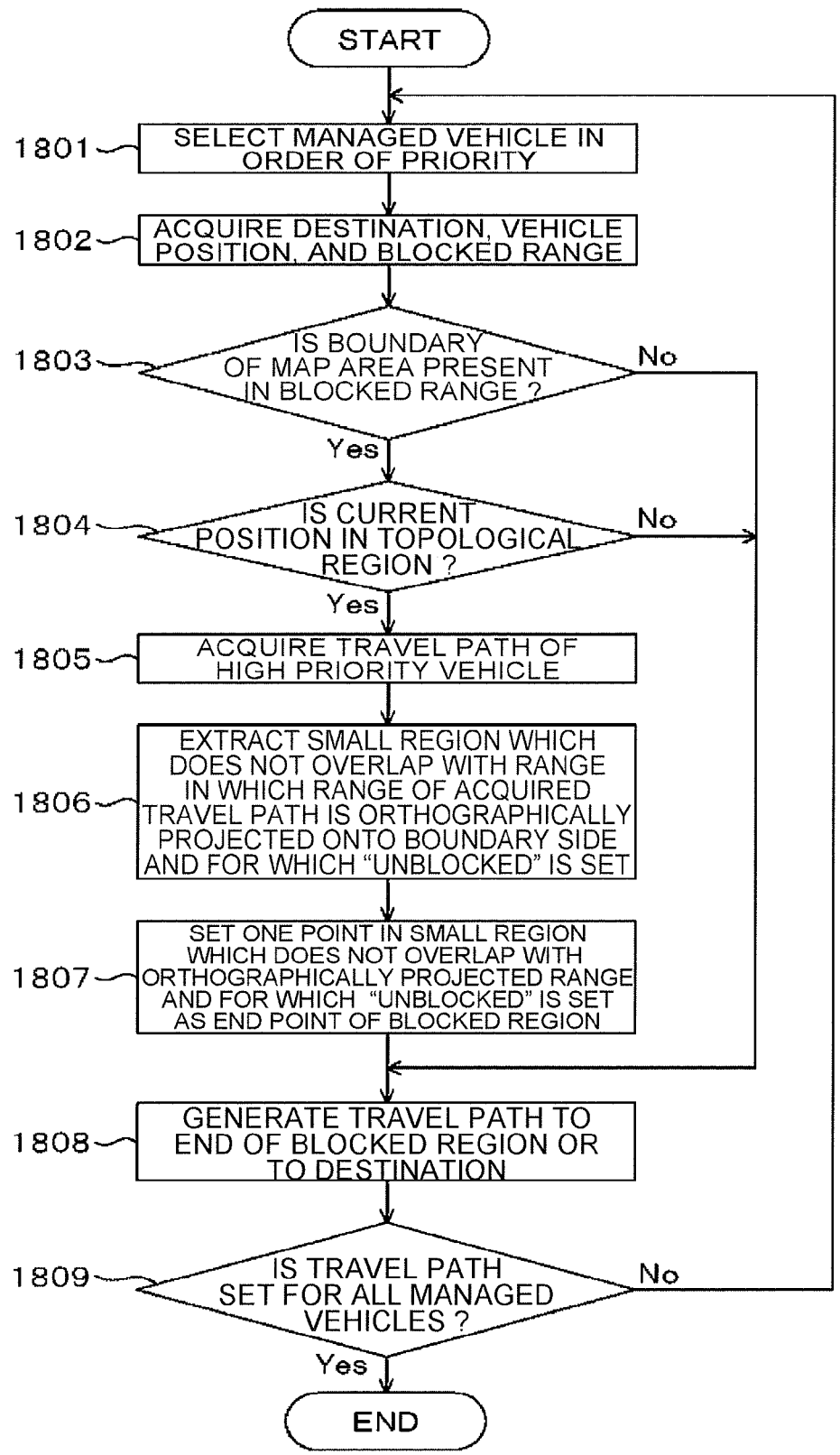
FIG. 18 is a flowchart showing the creation processing for a travel path plan.

FIG. 18 shows the travel path plan creation flow performed by the vehicle travel planning unit 107. In step 1801, one managed vehicle is selected from all managed vehicles in order of the priority 703 and the processing proceeds to step 1802. In step 1802, the information on the destination 704 and the vehicle position 705, corresponding to the managed vehicle number 702 of the managed vehicle selected in step 1801, is acquired from the memory region 110. In addition, a blocked region, which includes the managed vehicle number of the selected managed vehicle in the blocking vehicle number 503 and blocking vehicle number 603, is extracted from the information on the blocked regions for each of the topological region and the metric region stored in the blocked region database 109, all sub-links ID 502 or area IDs 602 for which the blocked state is set in those blocked regions are acquired, and the processing proceeds to step 1803.

In step 1803, the vehicle travel planning unit 107 determines whether there is the boundary of a map area in the extracted blocked region. To determine whether there is the boundary of a map area, the vehicle travel planning unit 107 reads the area shape of the area, corresponding to the area ID acquired in step 1802, from the data corresponding to the metric ID of the metric region and then determines whether a connection point is included in the area or whether a connection point is included in the link corresponding to the link ID acquired in step 1802. If there is the boundary of a map area in the blocked region, the processing proceeds to step 1804; if not, the processing proceeds to step 1808. In step 1804, the vehicle travel planning unit 107 determines whether the vehicle position 705 of the managed vehicle selected in step 1801 is present in the topological region. If it is present in the topological region, the processing proceeds to step 1805; if it is present in the metric region, the processing proceeds to step 1808.

In step 1805, the travel path of a vehicle with a priority higher than that of the managed vehicle selected in step 1801 is acquired. Because the travel plan creation processing is performed sequentially in the order of the priority of managed vehicles and because the travel path of a higher priority managed vehicle is already set, it is only required to acquire the information on a travel path 709 from the memory region 110. After acquiring the travel path, the processing proceeds to step 1806. In step 1806, the vehicle travel planning unit 107 determines an overlap between the range in which the range of the travel path acquired in step 1805 is orthographically projected on the boundary side and the blocked range of the blocked region acquired in step 1802. To check the overlap with the blocked range, it is only required to check if the points, created by orthographically projecting all waypoints, which are set on the travel path, on the boundary side, are in a small region for which "unblocked" is set in the blocked state.

Next, in step 1807, if a small region is extracted whose blocked range does not overlap with the range, in which the range of the travel path is orthographically projected, in the blocked region and for which "unblocked" is set in the blocked state, one point in the extracted small region is set as the end point of the blocked region and the processing proceeds to step 1808. In step 1808, a travel path to the end of the blocked region or to the destination is generated. Generating a travel path in this manner allows a managed vehicle to pass through a small region without interfering with the travel path of a higher-priority managed vehicle even when the managed vehicle travels across the blocked region. If the end point of the blocked region is not set, that is, if a small region is not extracted whose blocked range does not overlap with the range, in which the range of the travel path is orthographically projected, and for which "unblocked" is set in the blocked state, a travel path to the connection point is generated.

In this manner, even when the blocked ranges of the small regions of a plurality of managed vehicles overlap, a blocked range that is set by a higher priority managed vehicle is set with priority, and a travel path is generated in such a manner that a small region, in which a blocked range is set by a higher priority managed vehicle, is bypassed.

A travel path can be generated as follow. For a topological region, the travel path is the minimum path from the vehicle position to the destination calculated by the Dijkstra's algorithm. For a metric region, the travel path is generated by partitioning the metric region into small mesh cells and joining the mesh cells, which are not included in a blocked region that is set in the metric region, from the mesh cell including the vehicle position to the mesh cell including the destination or the end of the blocked region. Next, in step 1809, the vehicle travel planning unit 107 confirms whether a travel path is set for all managed vehicles. If a travel path is not set for one or more managed vehicles, the processing returns to step 1801 to repeat the processing up to step 1808. If a travel path is set for all managed vehicles, the processing is terminated.

In the description above, the travel path of a higher priority managed vehicle is orthographically projected on the boundary side. Instead of this, the travel path may be projected on the boundary side in parallel to the link that is connected to the boundary point and that is in the topological region side as when a blocked state is set for each small region.

Figure 19:
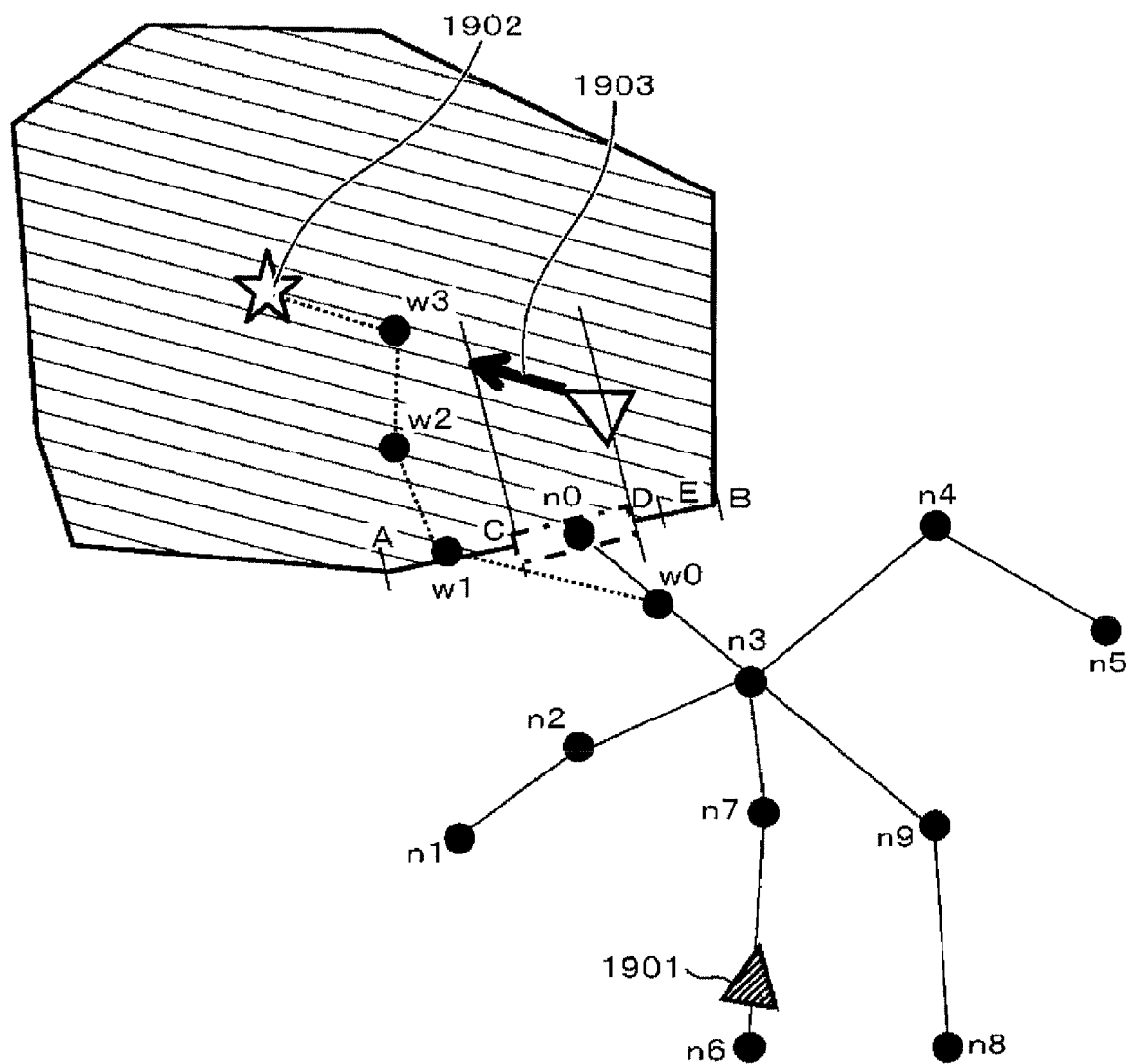
FIG. 19 is a diagram showing an example of path planning.

FIG. 19 shows one example of travel path generation. Assume that a managed vehicle 1901 is present between node n6 and not n7. If the blocked region of the managed vehicle 1901 extends to node n3 at a particular point in time, the path that is set is [n7, n3]. After that, assume that the managed vehicle 1901 moves to a point between waypoint w0 and node n3 and that the boundary side AB is all set as the blocked region of the managed vehicle 1901. At this time, assume that the travel path of a managed vehicle with a priority higher than that of the managed vehicle 1901 is acquired and that the travel path is a travel path 1903 such as the one indicated by the bold arrow in the figure. When the travel path 1903 of this higher priority managed vehicle is orthographically projected on the boundary side AB, it overlaps with the range of the small region in the section CD that is a small region on the boundary side generated by the managed vehicle 1901. Therefore, one point in a small region where no overlap occurs, for example, the intermediate point w1 of the side AC in the small region on the section AC in this example, is the end point of the first blocked region. In this case, [w0, w1], which includes this end point, is set as a path. After that, when the managed vehicle 1901 enters the metric region via the small region in the section AC, the path to a destination 1902 in the range of the blocked region is set and the travel path [w2, w3, destination 1902] is set.

Conventionally, the boundary side AB of the metric region is all blocked as a blocked region. Therefore, when entering the metric region section via connection point n0, the managed vehicle 1901 must stop before connection point n0 until the blocked region, set by another managed vehicle, is released. In contrast, the system according to the present invention, which provides the blocked region calculation/setting unit 106, releases a part of a blocked region that is set by another managed vehicle and sets a travel path, not via connection point n0, but via w1 in a small region for which a blocked region is not set by another managed vehicle. This method eliminates the need for a wasteful stop and allows a managed vehicle to travel efficiently.

When the travel paths of all managed vehicles are set, the vehicle travel planning unit 107 sends the travel path to each of the managed vehicles 101 from the communication unit 108 via the on-road device 117. Each managed vehicle sends the travel path, received from the road-vehicle communication unit 112, to the movement planning unit 113 and causes the movement planning unit 113 to make a speed plan and a steering plan so that the managed vehicle can arrive at the target points on the travel path sequentially along the travel path. The dynamics control unit 114 controls the vehicle behavior, based on the steering plan made by the movement planning unit 113, to implement an autonomous travel.

REFERENCE SIGNS LIST

101 Managed vehicle
102 Fleet management unit
103, 115 Map database
104 Vehicle position management unit
105 Vehicle passage monitoring unit
106 Blocked region calculation/setting unit
107 Vehicle travel planning unit
108 Communication unit
109 Blocked region database
110 Memory region
112 Road-vehicle communication unit
113 Movement planning unit
114 Dynamics control unit
116 Vehicle position calculation unit
117 On-road device

The invention claimed is:
1. An autonomous travel system comprising:
a fleet management unit which comprises:
   a map database in which a map of a first section and a map of a second section are mixed, the first section being a section in which a vehicle travel range is represented by a point and a line, the second section being a section in which a vehicle travel range is represented by a plane;
a vehicle position management unit which manages positions of a plurality of vehicles; and
a block setting unit which determines whether there is a vehicle near a boundary between a first section and a second section and, if there is a vehicle near a boundary, sets the boundary in a blocked state so that other vehicles do not enter there, the block setting unit dividing the boundary, for which a blocked state is set, into a plurality of regions and, for each of the divided regions through which no vehicle passes, releasing a blocked state of a boundary of a divided region;
the fleet management unit notifying respective vehicles of travel paths; and
a vehicle travel planning unit which plans a travel path of a vehicle based on blocked states of divided regions that are set on a boundary between a first section and a second section;
wherein the block setting unit determines, when dividing a boundary into a plurality of regions, lengths of a plurality of regions created by dividing a boundary according to a positional relation between a vehicle which approaches the boundary and the boundary.

2. The autonomous travel system according to claim 1, wherein priorities are set for respective vehicles in the block setting unit, and in settings of blocked states for the small regions blockings set by higher priority vehicles are prioritized.

3. The autonomous travel system according to claim 2, wherein the vehicle travel planning unit makes a travel path plan with one point on a boundary which is not blocked by a high priority vehicle as a target point when coordinates of a connection point on a boundary between the first section and the second section are blocked by a high priority vehicle.

4. The autonomous travel system according to claim 3, wherein the vehicle travel planning unit acquires a travel path of a high priority vehicle, sets the target point while avoiding a region on a divided boundary where a blocked state is set by a high priority vehicle, and generates a travel path.

5. The autonomous travel system according to claim 1, wherein the vehicle travel planning unit makes a travel path plan with one point on a boundary which is not blocked by a high priority vehicle as a target point when coordinates of a connection point on a boundary between the first section and the second section are blocked by a high priority vehicle.

6. The autonomous travel system according to claim 5, wherein the vehicle travel planning unit acquires a travel path of a high priority vehicle, sets the target point while avoiding a region on a divided boundary where a blocked state is set by a high priority vehicle, and generates a travel path.

7. An autonomous travel system comprising:
a fleet management unit which comprises:
a map database in which a map of a first section and a map of a second section are mixed, the first section being a section in which a vehicle travel range is represented by a point and a line, the second section being a section in which a vehicle travel range is represented by a plane;
a vehicle position management unit which manages positions of a plurality of vehicles; and
a block setting unit which determines whether there is a vehicle near a boundary between a first section and a second section and, if there is a vehicle near a boundary, sets the boundary in a blocked state so that other vehicles do not enter there, the block setting unit dividing the boundary, for which a blocked state is set, into a plurality of regions and, for each of the divided regions through which no vehicle passes, releasing a blocked state of a boundary of a divided region;
the fleet management unit notifying respective vehicles of travel paths; and
a vehicle travel planning unit which plans a travel path of a vehicle based on blocked states of divided regions that are set on a boundary between a first section and a second section;
wherein priorities are set for respective vehicles in the block setting unit, and in settings of blocked states for the small regions blockings set by higher priority vehicles are prioritized.

8. The autonomous travel system according to claim 7, wherein the vehicle travel planning unit makes a travel path plan with one point on a boundary which is not blocked by a high priority vehicle as a target point when coordinates of a connection point on a boundary between the first section and the second section are blocked by a high priority vehicle.

9. The autonomous travel system according to claim 8, wherein the vehicle travel planning unit acquires a travel path of a high priority vehicle, sets the target point while avoiding a region on a divided boundary where a blocked state is set by a high priority vehicle, and generates a travel path.

10. An autonomous travel system comprising:
a fleet management unit which comprises:
a map database in which a map of a first section and a map of a second section are mixed, the first section being a section in which a vehicle travel range is represented by a point and a line, the second section being a section in which a vehicle travel range is represented by a plane;
a vehicle position management unit which manages positions of a plurality of vehicles; and
a block setting unit which determines whether there is a vehicle near a boundary between a first section and a second section and, if there is a vehicle near a boundary, sets the boundary in a blocked state so that other vehicles do not enter there, the block setting unit dividing the boundary, for which a blocked state is set, into a plurality of regions and, for each of the divided regions through which no vehicle passes, releasing a blocked state of a boundary of a divided region;
the fleet management unit notifying respective vehicles of travel paths; and
a vehicle travel planning unit which plans a travel path of a vehicle based on blocked states of divided regions that are set on a boundary between a first section and a second section;
wherein the vehicle travel planning unit makes a travel path plan with one point on a boundary which is not blocked by a high priority vehicle as a target point when coordinates of a connection point on a boundary between the first section and the second section are blocked by a high priority vehicle.

11. The autonomous travel system according to claim 10, wherein the vehicle travel planning unit acquires a travel path of a high priority vehicle, sets the target point while avoiding a region on a divided boundary where a blocked state is set by a high priority vehicle, and generates a travel path.

12. An autonomous travel system comprising:
a fleet management unit which comprises:
a map database in which a map of a first section and a map of a second section are mixed, the first section being a section in which a vehicle travel range is represented by a point and a line, the second section being a section in which a vehicle travel range is represented by a plane;

a vehicle position management unit which manages positions of a plurality of vehicles; and a block setting unit which determines whether there is a vehicle near a boundary between a first section and a second section and, if there is a vehicle near a boundary, sets the boundary in a blocked state so that other vehicles do not enter there, the block setting unit dividing the boundary, for which a blocked state is set, into a plurality of regions and, for each of the divided regions through which no vehicle passes, releasing a blocked state of a boundary of a divided region;

the fleet management unit notifying respective vehicles of travel paths; and a vehicle travel planning unit which plans a travel path of a vehicle based on blocked states of divided regions that are set on a boundary between a first section and a second section;

wherein the fleet management unit further comprises a vehicle passage monitoring unit which detects that a vehicle moves from a section where a road is represented by a point and a line to a section where it is represented by a plane or that it moves from a section where a road is represented by a plane to a section where it is represented by a point and a line.

13. An autonomous travel system comprising:

a fleet management unit which comprises:

a map database in which a map of a first section and a map of a second section are mixed, the first section being a section in which a vehicle travel range is represented by a point and a line, the second section being a section in which a vehicle travel range is represented by a plane;

a vehicle position management unit which manages positions of a plurality of vehicles; and a block setting unit which determines whether there is a vehicle near a boundary between a first section and a second section and, if there is a vehicle near a boundary, sets the boundary in a blocked state so that other vehicles do not enter there, the block setting unit dividing the boundary, for which a blocked state is set, into a plurality of regions and, for each of the divided regions through which no vehicle passes, releasing a blocked state of a boundary of a divided region;

the fleet management unit notifying respective vehicles of travel paths; and a vehicle travel planning unit which plans a travel path of a vehicle based on blocked states of divided regions that are set on a boundary between a first section and a second section;

wherein the vehicle position management unit performs a vehicle position estimation in which a vehicle position on a line or on a point is calculated for a section where a road is represented by a point and a line using a map database and switches to a vehicle position estimation on a plane in a section where a road is represented by a plane.

* * * * *